US010832107B2

(12) United States Patent
Onoguchi

(10) Patent No.: US 10,832,107 B2
(45) Date of Patent: Nov. 10, 2020

(54) CONTROL METHOD FOR INFORMATION PROCESSING APPARATUS, INFORMATION PROCESSING APPARATUS, AND NON-TRANSITORY COMPUTER-READABLE MEDIUM

(71) Applicant: CANON KABUSHIKI KAISHA, Tokyo (JP)

(72) Inventor: Ryota Onoguchi, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/453,091

(22) Filed: Jun. 26, 2019

(65) Prior Publication Data

US 2020/0012910 A1    Jan. 9, 2020

(30) Foreign Application Priority Data

Jul. 6, 2018 (JP) ................ 2018-129462

(51) Int. Cl.
*G06K 15/00* (2006.01)
*G06K 15/02* (2006.01)

(52) U.S. Cl.
CPC ....... *G06K 15/1885* (2013.01); *G06K 15/007* (2013.01); *G06K 15/025* (2013.01); *G06K 15/1868* (2013.01); *G06K 15/1871* (2013.01)

(58) Field of Classification Search
CPC .................. G06K 15/1885; G06K 15/007
See application file for complete search history.

(56) References Cited

U.S. PATENT DOCUMENTS

| 2007/0229904 A1* | 10/2007 | Mori ............... | G06F 40/103 358/1.18 |
| 2009/0044117 A1* | 2/2009 | Vaughan ........... | G11B 27/034 715/716 |
| 2012/0300262 A1* | 11/2012 | Kuranoshita ...... | G03G 15/5075 358/1.18 |
| 2013/0113825 A1* | 5/2013 | Wine ................ | G09F 19/12 345/629 |
| 2018/0032481 A1* | 2/2018 | Ishida .............. | B42C 19/00 |

FOREIGN PATENT DOCUMENTS

JP    2000-108467 A    4/2000

* cited by examiner

*Primary Examiner* — Ibrahim Siddo
(74) *Attorney, Agent, or Firm* — Venable LLP

(57) ABSTRACT

A control method for an information processing apparatus that displays an edit screen of print data for printing a predetermined page, comprising: displaying, on the edit screen, a print region that includes a binding position indicating a position at which binding is performed using a binding material in the predetermined page and indicates a printable region in the predetermined page; receiving designation of a layout position of an image in the predetermined page; and making a notification if the designation is received so that the image is laid out in a predetermined region including at least a partial region in the print region between the binding position and a side of the print region on a side of the binding position, wherein a printing apparatus executes printing based on the print data edited in the edit screen.

19 Claims, 15 Drawing Sheets

FIG. 7

CONTROL METHOD FOR INFORMATION PROCESSING APPARATUS, INFORMATION PROCESSING APPARATUS, AND NON-TRANSITORY COMPUTER-READABLE MEDIUM

BACKGROUND OF THE INVENTION

Field of the Invention

The present invention relates to a control method for an information processing apparatus, the information processing apparatus, and a non-transitory computer-readable medium.

Description of the Related Art

As a method of printing a side stitch booklet, there is known a method of binding printed sheets by a binding material such as a staple. Japanese Patent Laid-Open No. 2000-108467 describes a technique of displaying a stapler in a finishing designation screen for designating the finished state of a booklet.

If a side stitch booklet is printed by a method of binding by a binding material such as a staple, a user cannot visually perceive, in a spread in the booklet, a region on a spine side with respect to a binding position at which the binding material is attached. That is, depending on contents of a user instruction concerning the layout of an image, printing may be unwantedly executed without user's intention so that the image is included in a region that cannot be visually perceived by the user after printing.

SUMMARY OF THE INVENTION

The present invention has been made in consideration of the above problem, and prevents printing from being executed without user's intention so that an image is included in a region that cannot be visually perceived by the user after printing.

According to one aspect of the present invention, there is provided a control method for an information processing apparatus that displays an edit screen of print data for printing a predetermined page, comprising: displaying, on the edit screen, a print region that includes a binding position indicating a position at which binding is performed using a binding material in the predetermined page and indicates a printable region in the predetermined page; receiving designation of a layout position of an image in the predetermined page; and making a notification if the designation is received so that the image is laid out in a predetermined region including at least a partial region in the print region between the binding position and a side of the print region on a side of the binding position, wherein a printing apparatus executes printing based on the print data edited in the edit screen.

According to another aspect of the present invention, there is provided an information processing apparatus for displaying an edit screen of print data for printing a predetermined page, comprising: a display unit configured to display, on the edit screen, a print region that includes a binding position indicating a position at which binding is performed using a binding material in the predetermined page and indicates a printable region in the predetermined page; a reception unit configured to receive designation of a layout position of an image in the predetermined page; and a notification unit configured to make a notification if the designation is received so that the image is laid out in a predetermined region including at least a partial region in the print region between the binding position and a side of the print region on a side of the binding position, wherein a printing apparatus executes printing based on the print data edited in the edit screen.

According to another aspect of the present invention, there is provided a non-transitory computer-readable medium storing a program for causing a computer to execute a method, comprising: displaying, on an edit screen of print data, a print region that includes a binding position indicating a position at which binding is performed using a binding material in a predetermined page and indicates a printable region in the predetermined page; receiving designation of a layout position of an image in the predetermined page; and making a notification if the designation is received so that the image is laid out in a predetermined region including at least a partial region in the print region between the binding position and a side of the print region on a side of the binding position, wherein a printing apparatus executes printing based on the print data edited in the edit screen.

According to the present invention, it is possible to prevent printing from being executed without user's intention so that an image is included in a region that cannot be visually perceived by the user after printing.

Further features of the present invention will become apparent from the following description of exemplary embodiments (with reference to the attached drawings).

BRIEF DESCRIPTION OF THE DRAWINGS

FIG. 7 is a view showing an example of the edit screen in the bookbinding application;

DESCRIPTION OF THE EMBODIMENTS

Embodiments of the present invention will be described below with reference to the drawings.

(System and Apparatus Arrangements)

Figure 1:
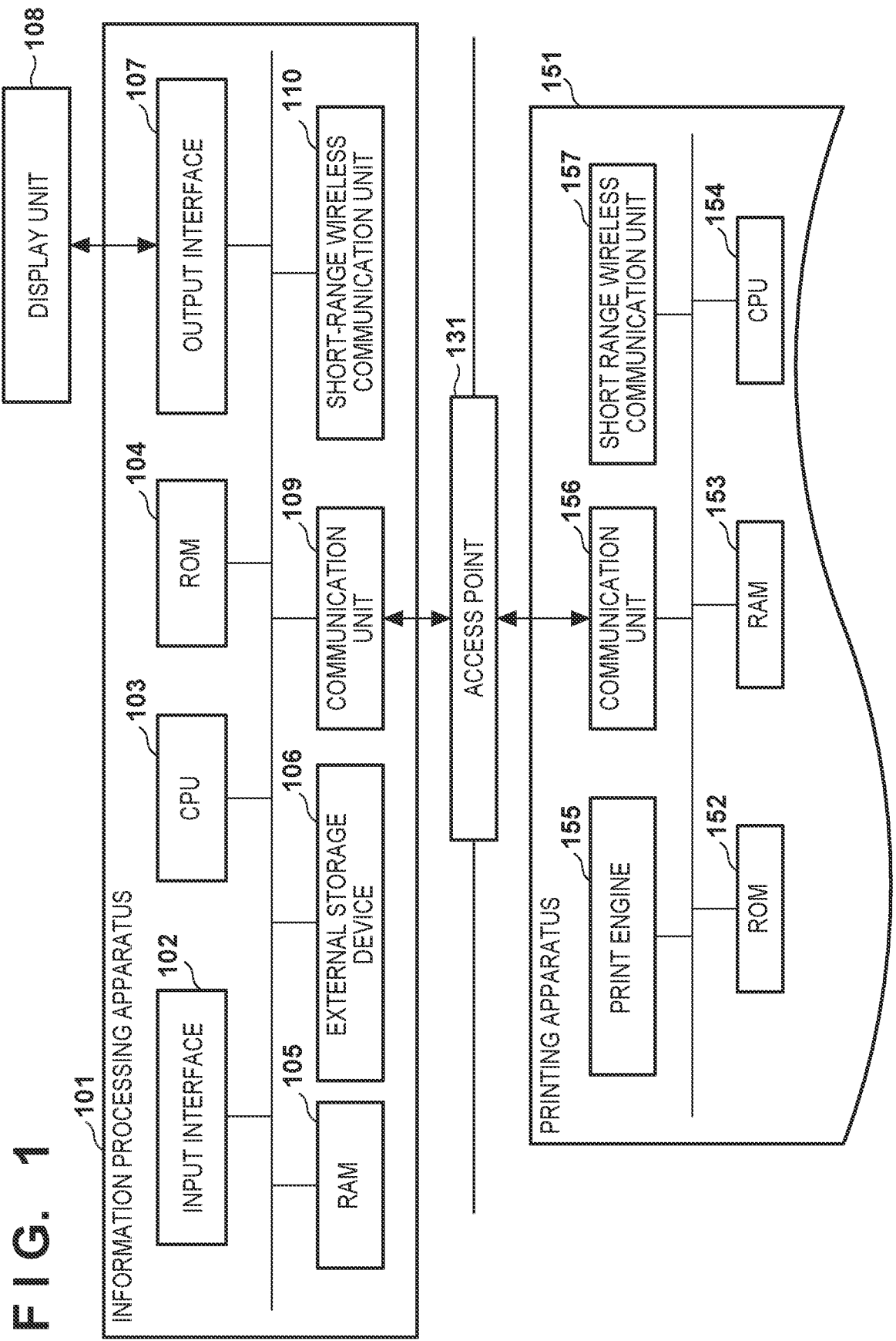
FIG. 1 is a block diagram showing an example of a system arrangement and examples of the hardware arrangements of apparatuses.

An example of a system arrangement according to this embodiment will be described with reference to FIG. 1. This system includes an information processing apparatus 101 and a printing apparatus 151, and executes print processing by sending print data prepared by the information processing apparatus 101 to the printing apparatus 151 via a network. Note that communication between the information processing apparatus 101 and the printing apparatus 151 can be performed via an access point 131 by, for example, a wireless LAN complying with the IEEE802.11 standard series. Note that although an embodiment based on a network arrangement using the access point 131 will be described below, another arrangement in which the information processing apparatus 101 and the printing apparatus 151 are communicable with each other may be used. For example, the information processing apparatus 101 and the printing apparatus 151 may be connected via a wired line (not shown). Furthermore, an apparatus having both the function of the information processing apparatus 101 and the function of the printing apparatus 151 may be used. In this case, information can be exchanged between the information processing apparatus 101 and the printing apparatus 151 via buses in the apparatuses and the like. A plurality of blocks shown in FIG. 1 may be integrated into one block and one block may be divided into a plurality of blocks. In addition, a block other than those shown in FIG. 1 may be added, and one or more of the blocks shown in FIG. 1 may be omitted.

The information processing apparatus 101 is an arithmetic apparatus capable of converting print target data into print data, such as a personal computer (PC), a smartphone, a mobile terminal, a notebook PC, a tablet terminal, or a PDA (Personal Digital Assistant). The printing apparatus 151 is an arbitrary printer capable of executing print processing by obtaining print data from an external apparatus such as the information processing apparatus 101. Assume that the printing apparatus 151 executes printing by the inkjet method in this embodiment. However, for example, the printing apparatus 151 may execute printing by another arbitrary method such as an electrophotographic method. The printing apparatus 151 may be a Multi Function Peripheral having a plurality of functions such as a copy function, a FAX function, and a print function.

The information processing apparatus 101 includes, for example, an input interface 102, a CPU 103, a ROM 104, a RAM 105, an external storage device 106, an output interface 107, a communication unit 109, and a short-range wireless communication unit 110. CPU, ROM, and RAM are acronyms for "Central Processing Unit", "Read Only Memory", and "Random Access Memory", respectively. The computer of the information processing apparatus 101 is formed by the CPU 103, the ROM 104, the RAM 105, and the like. Note that although FIG. 1 shows an example a case in which the information processing apparatus 101 displays information on a display device (display unit 108) such as an external display, the information processing apparatus 101 may include the display unit 108.

The input interface 102 is an interface for receiving a data input and an operation instruction from a user. The input interface 102 is formed by, for example, a physical keyboard, buttons, a touch panel, or the like. Note that the output interface 107 (to be described later) and the input interface 102 may be integrated so that output of a screen and reception of an operation from the user are performed using common hardware.

The CPU 103 serves as a system control unit, and controls the overall information processing apparatus 101. The ROM 104 stores permanent data such as control programs to be executed by the CPU 103, data tables, and an embedded operating system (to be referred to as an "OS" hereinafter) program. In this embodiment, the control programs stored in the ROM 104 perform software execution control such as scheduling, task switching, and interrupt processing under the management of the embedded OS stored in the ROM 104. The RAM 105 is implemented by an SRAM (Static Random Access Memory) or the like that needs a backup power supply. Note that the RAM 105 holds data by a primary battery (not shown) for data backup, and can thus store important data such as program control variables without volatilizing them. The RAM 105 can be provided with a memory area to store setting information and management data of the information processing apparatus 101, and the like. The RAM 105 can also be used as the main memory and work memory of the CPU 103.

The external storage device 106 saves an application for providing a print execution function, a print information generation program for generating print information interpretable by the printing apparatus 151, and the like. The external storage device 106 can also save various programs such as a control program for sending/receiving information to/from another apparatus (for example, the printing apparatus 151) connected via the communication unit 109, and various kinds of information to be used by these programs.

The output interface 107 is an interface used by the display unit 108 to perform control for displaying data and presenting information of the state of the information processing apparatus 101. The output interface 107 outputs control information and display target information for causing the display unit 108 to display the information. The display unit 108 includes an LED (Light Emitting Diode) and LCD (Liquid Crystal Display), and displays data and notifies the user of the state of the information processing apparatus 101. Note that a software keyboard including keys such as numerical value input keys, a mode setting key, an enter key, a cancel key, and a power key may be displayed on the display unit 108, and an input from the user may be received via the software keyboard.

The communication unit 109 includes a radio frequency (RF) circuit and a baseband circuit for executing data communication by performing connection to an external apparatus such as the printing apparatus 151. For example, the communication unit 109 can communicate with the printing apparatus 151 via the access point 131 existing separately from the information processing apparatus 101 and the printing apparatus 151. The access point 131 can be, for example, a device such as a wireless LAN router that operates in accordance with a wireless communication method complying with the IEEE802.11 standard series. Furthermore, the communication unit 109 may establish direct connection to the printing apparatus 151 in accordance with a protocol such as Wi-Fi (Wireless Fidelity) Direct®. If the printing apparatus 151 includes an access point (not shown), the communication unit 109 may be connected to the access point to establish direct connection to the printing apparatus 151. Note that the communication unit 109 can be configured to perform communication by WiFi® but may perform communication by another wireless communication method such as Bluetooth®.

The short-range wireless communication unit 110 executes data communication by establishing wireless connection to the short-range wireless communication unit 157 of the printing apparatus 151 based on at least the fact that the printing apparatus 151 (external apparatus) enters a predetermined short-range area. The short-range wireless communication unit 110 performs communication by a communication method different from that of the communication unit 109, such as Bluetooth Low Energy (BLE) or Near Field Communication (NFC).

The printing apparatus 151 includes, for example, a ROM 152, a RAM 153, a CPU 154, a print engine 155, a communication unit 156, and a short-range wireless communication unit 157.

The communication unit 156 includes a radio frequency (RF) circuit and a baseband circuit for performing connection to an external apparatus such as the information processing apparatus 101. The communication unit 156 corresponds to the communication unit 109 of the information processing apparatus 101, and performs communication by a wireless communication method such as Wi-Fi or Bluetooth. The communication unit 156 may be directly connected to the communication unit 109 of the information processing apparatus 101 by functioning as an access point or in accordance with a predetermined protocol, as described above, or may be connected to the communication unit 109 via the external access point 131 or the like. If the communication unit 156 functions as an access point, the communication unit 156 may have hardware for functioning as an access point, or may use software that allows the communication unit 156 to function as an access point. Note that although the information processing apparatus 101 and the printing apparatus 151 are connected to the one access point 131 in the example of FIG. 1, they may be connected to different access points connected to the network, and may be connected to each other via the network.

The short-range wireless communication unit 157 executes data communication by establishing wireless connection to the short-range wireless communication unit 110 of the information processing apparatus 101 based on at least the fact that the information processing apparatus 101 (external apparatus) enters a predetermined short-range area. The short-range wireless communication unit 157 corresponds to the short-range wireless communication unit 110 of the information processing apparatus 101, and performs communication by a wireless communication method such as BLE. Note that, for example, print information sent from the information processing apparatus 101 or the like has a large amount of data, requires high-speed large-capacity communication, and is thus received via the communication unit 156 capable of performing communication at a speed higher than that of the short-range wireless communication unit 157.

The RAM 153 is a memory similar to the RAM 105. The RAM 153 is provided with a memory area to store setting information and management data of the printing apparatus 151, and the like. The RAM 153 is also used as the main memory and work memory of the CPU 154, functions as a reception buffer for temporarily saving print information received from the information processing apparatus 101 or the like, and also saves various kinds of information. The ROM 152 stores permanent data such as control programs to be executed by the CPU 154, data tables, and an OS program. When the CPU 154 executes the control programs stored in the ROM 152, software execution control such as scheduling, task switching, and interrupt processing can be executed under the management of the embedded OS stored in the ROM 152. The CPU 154 serves as a system control unit, and controls the overall printing apparatus 151. Note that a memory such as an external HDD or SD card may be mounted as an optional device on the printing apparatus 151, and the information saved in the printing apparatus 151 may be saved in such memory.

The print engine 155 forms an image on a print medium such as a sheet using a recording material such as ink based on the information saved in the RAM 153 and the print information received from the information processing apparatus 101 or the like, and outputs a print result.

Figure 2:
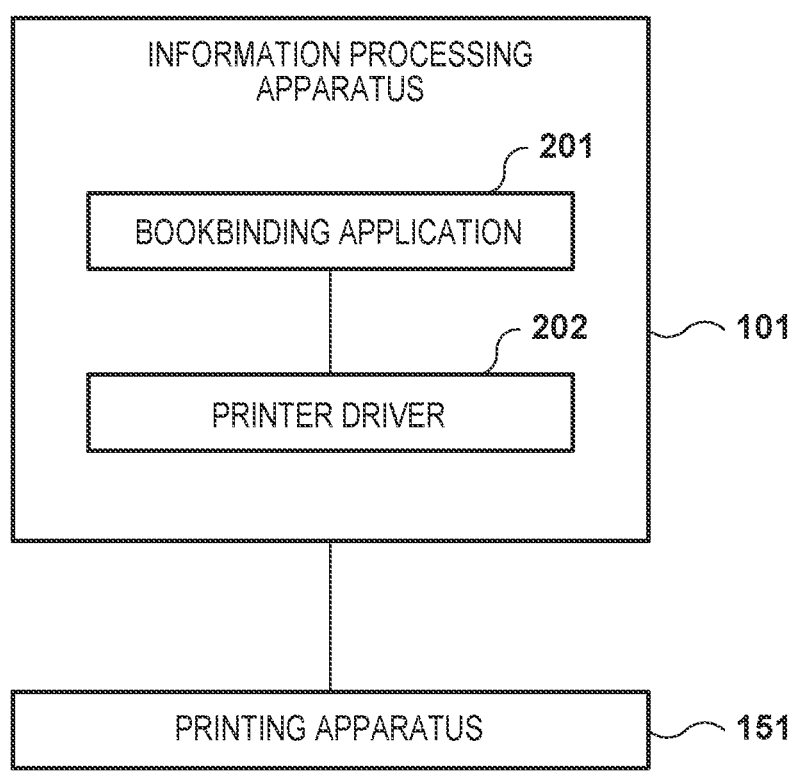
FIG. 2 is a block diagram showing an example of the software arrangement of the information processing apparatus.

FIG. 2 is a block diagram showing an example of the functional arrangement of the information processing apparatus 101. The information processing apparatus 101 includes, for example, as functional components, a bookbinding application 201 that executes processing (to be described later), and a printer driver 202 that generates print data interpretable by the printing apparatus 151. When the user inputs a print instruction to the screen of the bookbinding application 201 (to be described later), the printer driver 202 receives application data output from the bookbinding application 201, and generates print data. Then, when the printer driver 202 sends the print data generated by the bookbinding application 201 to the printing apparatus 151, the printing apparatus 151 executes print processing.

(Overview of Operation of Bookbinding Application)

Figure 3:
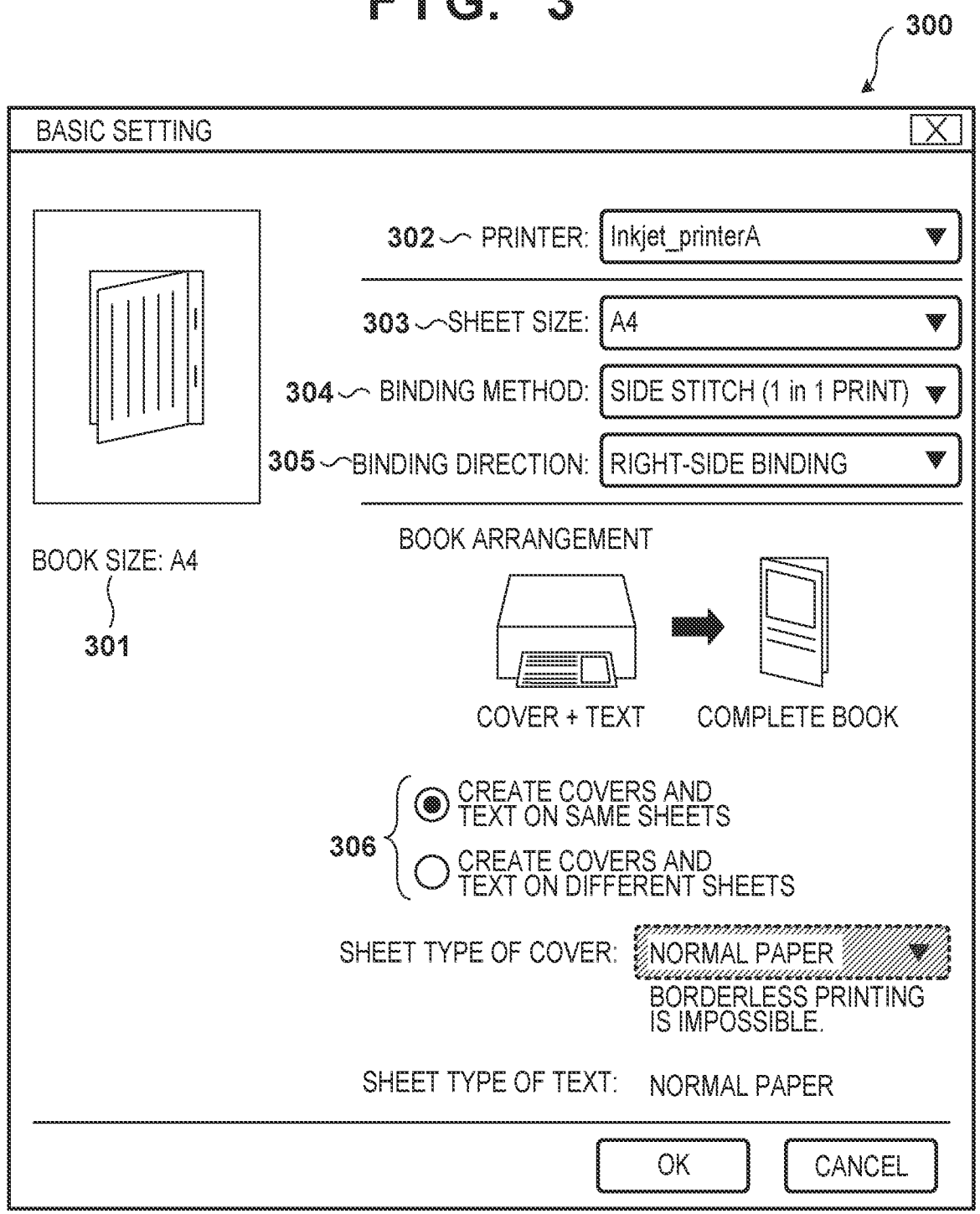
FIG. 3 is a view showing an example of the basic setting screen of a bookbinding application.

Subsequently, an example of the procedure of an operation executed by the above-described bookbinding application 201 will be described. FIG. 3 shows an example of a basic setting screen displayed on the display unit 108 when the CPU 103 of the information processing apparatus 101 executes, for example, programs corresponding to the bookbinding application 201 stored in the ROM 104 and the external storage device 106. As an example, a basic setting screen 300 includes a post-printing image 301, a printer selection region 302, a sheet size selection region 303, a binding method setting region 304, a binding direction setting region 305, and a cover sheet-related setting region 306.

The printer selection region 302 is a region where a printing apparatus to be used is selected. When a pull-down button in the printer selection region 302 is pressed by a user operation, a list of printing apparatuses usable by the information processing apparatus 101 is displayed, and the user can select a printing apparatus to be used to create a booklet by the bookbinding application 201. Note that with respect to the list of the printing apparatuses displayed when the pull-down button in the printer selection region 302 is pressed, only printing apparatuses supportable by the bookbinding application 201 can be displayed. However, the present invention is not limited to this. For example, all the printing apparatuses usable by the information processing apparatus 101 may be displayed regardless of whether they can be supported by the bookbinding application 201.

The sheet size selection region 303 is a region where a sheet size to be used for printing is selected. When a pull-down button in the sheet size selection region 303 is pressed by a user operation, a list of sheet sizes usable by the printing apparatus selected in the printer selection region 302 is displayed. The user can select, from the displayed list of the sheet sizes, one size corresponding to the size of a booklet to be created. Note that information of the sheet sizes usable by the printing apparatus selected in the printer selection region 302 can be obtained from the printing apparatus via, for example, the printer driver 202.

The binding method setting region 304 is a region where a binding method of a booklet is set. When a pull-down button in the binding method setting region 304 is pressed by a user operation, for example, "side stitch" and "saddle stitch" are selectably displayed. "Side stitch" is a binding method of performing printing by attaching a binding material such as a staple at a position a predetermined distance away from a spine portion of a booklet. "Saddle stitch" is a binding method of performing printing by attaching a binding material such as a staple to a folding portion of doubled sheets. If "saddle stitch" is selected, it is assumed that the sheets are doubled, and thus a 2-in-1 print setting can be selected automatically. Note that if "saddle stitch" is selected, for example, settings such as 4-in-1 other than 1-in-1 may be selectably displayed. Note that if "side stitch" is selected, a 1-in-1 print setting can be selected automatically. In this case as well, however, settings such as 2-in-1 and 4-in-1 may be selectably displayed. Note that if 2-in-1 is not selected for "saddle stitch" or if 1-in-1 is not selected for "side stitch", page allocation (to be described later) is different accordingly. Note also that the N-in-1 print setting is a print setting for printing N images based on N image data on a sheet (one sheet) for one page.

The binding direction setting region 305 is a region where a binding direction of a booklet is set. When a pull-down button in the binding direction setting region 305 is pressed by a user operation, for example, "right-side binding" and "left-side binding" are selectably displayed. In some cases, "upper binding" may be selectably displayed. "Right-side binding" indicates a binding direction that binds the right side of the front cover, and "left-side binding" indicates a binding direction that binds the left side of the front cover. In addition, "upper binding" indicates a binding direction that binds the upper portion of the cover. A string "binding direction" in the binding direction setting region 305 may be replaced by "open direction" or the like. The rightward corresponds to right-side binding and the leftward corresponds to left-side binding. The setting in this region determines whether the pages of a booklet to be created advance from right to left or from left to right.

The cover sheet-related setting region 306 is a region where a cover sheet is set. For example, radio buttons that allow the user to select one of an item for creating covers and text by the same type of sheets and an item for creating covers and text by different types of sheets are displayed. Note that if, in the setting region 306, the covers and text are created by the same type of sheets, the sheet type (for example, "normal paper" or the like) of the text is set as the sheet type of the covers, and thus the region that allows selection of the sheet type of the covers is grayed out so as not to be selected. On the other hand, if the setting of creating covers and text by different types of sheets is selected in the setting region 306, the region that allows selection of the sheet type of the covers is activated. Then, when a pull-down button in the region where the sheet type of the covers is set is pressed, a list of selectable sheet types (for example, glossy paper, normal paper, and the like) is displayed. Note that, for example, if "normal paper" is selected, a character string "borderless printing is impossible" can be displayed. Alternatively, if a sheet type (for example, "glossy paper") except for "normal paper" is selected, a character string "borderless printing is possible" can be displayed. This is because printing can be executed on normal paper using a recording material containing a pigment but borderless printing cannot be executed in printing using a recording material containing a pigment. In addition, necessary information may be set for each sheet type, and a character string corresponding to the sheet type selected by a user operation may be displayed. Furthermore, if the setting of creating covers and text by different types of sheets is selected, a message such as "it is necessary to print by setting different sheets for cover/text" may be displayed.

When "OK" is pressed in the basic setting screen shown in FIG. 3, the screen transitions to an edit screen. The edit screen is a screen for editing each page by receiving a user instruction. Print data for printing each page is generated based on a result of editing in the edit screen. The edit screen may be different in accordance with the setting items such as the binding method and the setting of whether the sheet type of the covers is set to be the same as that of the text. Examples of the edit screen corresponding to the basic settings will be described below.

[Case in which Side Stitch is Selected and Covers and Text are Created by Same Type of Sheets]

Figure 4:
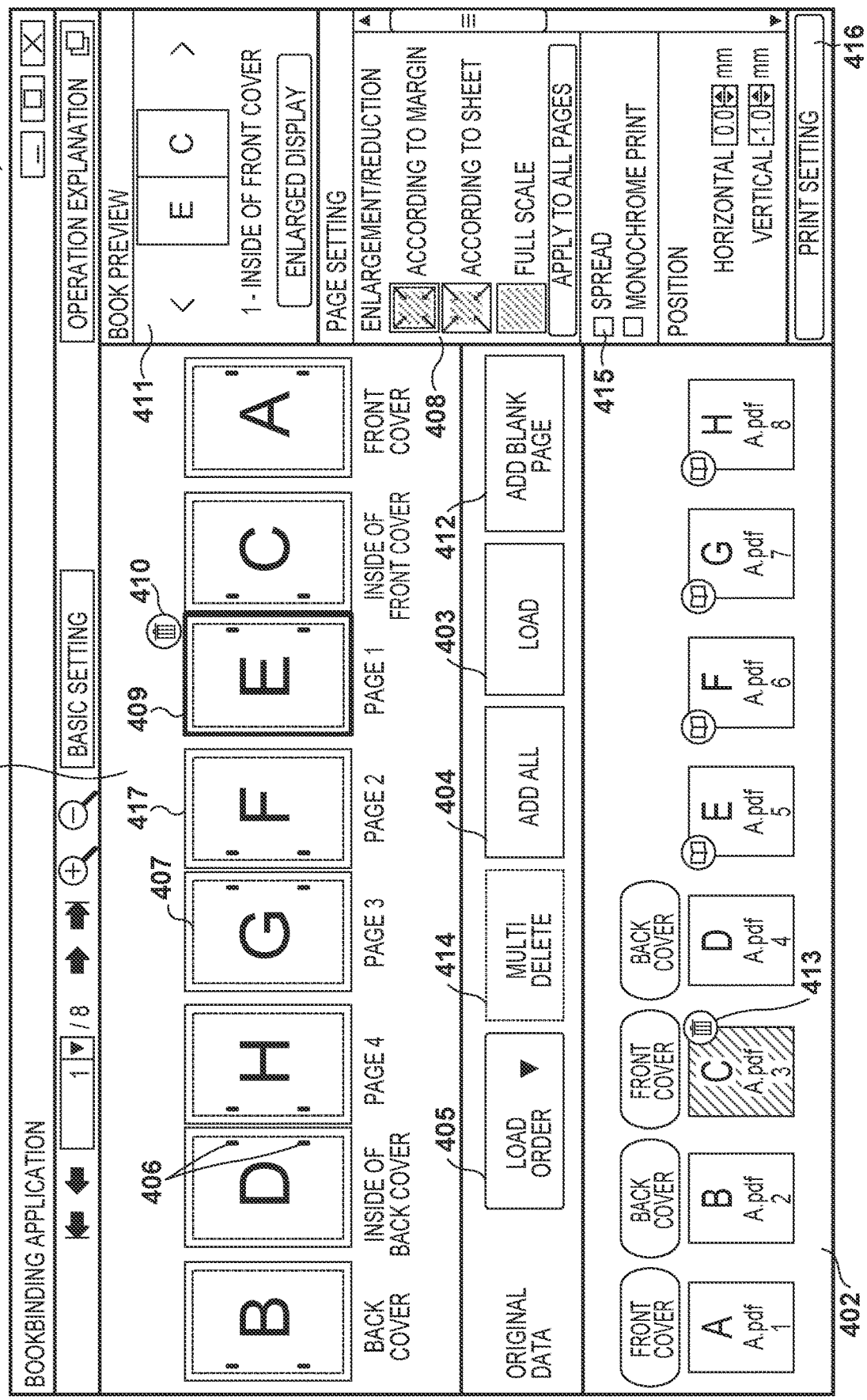
FIG. 4 is a view showing an example of an edit screen in the bookbinding application.

FIG. 4 shows an example of the edit screen when the binding method is side stitch (1-in-1), right-side binding is selected, and the setting of using the same type of sheets for the covers and text is made. Note that the example of FIG. 4 shows an example of a state in which eight (from original data representing an image in which "A" is written to original data representing an image in which "H" is written) original data (image data) have already been loaded. In a stage before original data are loaded, an edit region 401 and an original data region 402 are in a predetermined state (for example, a blank state) in which the user can recognize that no original data have been loaded. Note that in, for example, the stage before the original data are loaded, a message such as "please load original data to be put in a booklet" may be displayed in the edit region 401, and a message that notifies the user of a method of loading data may further be displayed. Note that such message may be displayed in the original data region 402. Another method such as display of a dialog may be used to prompt the user to load original data.

When the user clicks on a "load" button 403, for example, a file selection dialog is displayed, and the user selects, from a displayed file list, a file to be used to create a booklet. When a file is selected, contents of the file (original data included in the file) are expanded in the original data region 402. Furthermore, when a file is selected, a result of performing automatic page allocation as processing of automatically allocating (linking) original data included in the file to pages to be printed can be displayed in the edit region 401. Note that in automatic page allocation, specific original data to be allocated to a specific page may be arbitrarily decided. Assume that numbers are assigned to the original data and original data having a smaller number is allocated to a page having a smaller number. The edit region 401 shown in FIG. 4 shows an example of a case in which automatic page allocation is performed in this way. In the expanded file, original data as the first original data representing an image in which "A" is written is set in the front cover as the first page. Then, original data as the second original data representing an image in which "B" is written is set in the back cover as the second page. Original data as the third original data representing an image in which "C" is written is set in the inside of the front cover as the third page, and original data as the fourth original data representing an image in which "D" is written is set in the inside of the back cover as the fourth page. Note that the numbers of pages other than the back cover and its inside may be smaller than those of the back cover and its inside. That is, the first and second original data in the file may be allocated to "front cover" and "inside of front cover", respectively. The last original data and the second original data from the last in the file may be allocated to "back cover" and "inside of back cover", respectively. Note that FIG. 4 and some following examples show an example of a case in which right-side binding is selected, and the front cover is displayed at the rightmost end and the back cover is displayed at the leftmost end. However, if left-side binding is selected, the front cover is displayed at the leftmost end and the back cover is displayed at the rightmost end.

Note that when the contents of the file are expanded in the original data region 402, for example, a confirmation message such as "do you want to perform automatic page allocation?" may be displayed to receive user determination of whether to automatically perform page allocation. In this case, if the user approves automatic page allocation, a result of performing automatic page allocation is displayed in the edit region 401; otherwise, the edit region 401 may remain blank. Alternatively, the contents of the selected file may only be expanded in the original data region 402 without performing automatic page allocation regardless of user determination. Note that even if automatic page allocation is not performed, when the user clicks on an "add all" button 404, automatic page allocation of the original data expanded in the original data region 402 can be performed. Note that the user can perform manual page allocation by dragging and dropping, in the edit region 401, the original data expanded in the original data region 402. That is, the user can arbitrarily decide a specific original data to be allocated to a specific page. Note that manual page allocation may be executed in a state in which no automatic page allocation has been performed or may be executed to change contents of allocation after automatic page allocation is performed.

Note that when a plurality of files are read out, all contents of the plurality of files are expanded in the original data region 402. At this time, the order of the original data to be expanded can be decided by a pull-down menu 405. For example, if, as shown in FIG. 4, "load order" is selected, the data are expanded in the original data region 402 in an order such that data of a file selected earlier and thus loaded earlier is displayed on the left side. To the contrary, if, for example, "file name order" (not shown) is selected, the data are expanded in ascending (descending) order of file names. If, for example, a file whose name is "A.pdf" is opened after a file whose name is "B.pdf", when "load order" is selected, data of "A.pdf" is displayed on the right side of a position at which data of "B.pdf" is displayed. On the other hand, if "file name order" is selected, even if "B.pdf" is opened first, the data of "B.pdf" is displayed on the right side of a position at which the data of "A.pdf" is displayed. Note that the sort order is not limited to the load order or the file name order, and various orders such as the order of the file creation date (update date), the order of the use frequency in this application, and the order of the file capacity can be used. Note that the example in which the data of the pdf form are loaded has been explained but the present invention is not limited to this. For example, data of the jpg form may be loaded. Furthermore, a plurality of original data corresponding to a plurality of pages may be included in one data of pdf form. If data of the pdf form including a plurality of original data is loaded, the plurality of original data included in the data of the pdf form are discriminated and expanded in the original data region 402. The order of expansion of the original data is a page order defined in the data of the pdf form.

In the edit region 401, sheet regions (medium regions) 417 each indicating the size of a print medium on which each page is printed and images represented by the original data allocated to the respective pages are displayed. The sheet regions 417 are displayed in the edit region 401 in the page order of the booklet after completion. Furthermore, display is performed so that the distance between two pages included in a double-page spread is shorter than the distance to another page that is adjacent but forms no double-page spread. This allows the user to readily determine a page forming a double-page spread and a page forming no double-page spread. Note that the double-page spread indicates pages for printing one image represented by one original data to span two pages. Therefore, two pages included in a double-page spread are pages that are adjacent to each other and are printed on different sheets. In the example of FIG. 4, when the distance between the page where "C" is written and the page where "E" is written is sufficiently short, it is understood that these pages have the spread relationship. On the other hand, when the distance between the page where "E" is written and the page where "F" is written is relatively longer than that between the page where "C" is written and the page where "E" is written, it is understood that these pages are adjacent to each other but have no spread relationship. In this way, all the pages included in the booklet are displayed in the edit region 401. Note that the example of FIG. 4 shows an example of a case in which all the pages included in the booklet can be displayed as a whole. However, if the number of pages increases while maintaining the state in which all pages are displayed, the size of each page may become small. To cope with this, the bookbinding application can be configured to perform enlargement/reduction display of each page. At this time, if all the pages cannot be displayed in the edit region 401, a display area can be moved by, for example, displaying a scroll bar in the lower portion of the edit region 401.

Note that if side stitch is selected, binding positions 406 at which sheets on which images displayed in the edit region 401 are printed are bound by binding materials such as staples are also displayed in the sheet regions. The binding positions 406 can be displayed in the pages by, for example, a predetermined color (for example, red) so that the user can recognize them. The binding positions 406 can be printed intact as they are displayed in the sheet regions. This allows the user to grasp the positions at which staples are to be attached when binding the booklet. Note that the binding positions 406 may be printed on the front cover and the back cover, and may not be printed on the remaining pages. The binding material for binding the booklet is not limited to a staple, and may be, for example, a string or plastic band. In addition, when designation of the layout positions of the binding positions 406 in the sheet regions is received from the user, the binding positions 406 can be located at arbitrary positions.

In each sheet region 417 displayed in the edit region 401, a print region 407 indicating a region where an image can be printed is displayed. A line indicated by the print region 407 in FIG. 4 indicates the boundary between the print region and a margin region where a margin is always provided (that is, no image is printed without fail). When the user inputs each setting value in a region of page setting 408, the original data is laid out in the sheet region 417 based on the setting values. For example, in the page setting 408, the user sets the enlargement/reduction method of each image laid out in the edit region 401. More specifically, if "according to margin" is selected, each image is enlarged/reduced to fit in with the print region 407. If "according to sheet" is selected, each image is enlarged/reduced to fit in with the sheet region 417. If "full scale" is selected, each image is displayed in the actual size without enlargement/reduction. Note that a portion of each image that extends outside the print region 407 is not printed, and is thus displayed translucently. For example, the user sets the position of each image in the page setting 408. If, for example, a negative value is input as the vertical or horizontal position of the image, the position of the image laid out in the sheet region 417 is moved upward or leftward. Alternatively, if a positive value is input as the vertical or horizontal position of the image, the position of the image laid out in the sheet region 417 is moved downward or rightward. This allows the user to set in detail how the image represented by the original data is laid out in the sheet region 417. Note that these settings can be applied for each page. For example, in the state in which the page where "E" is written is selected in the edit region 401, when the setting values are input in the page setting 408, the setting values are applicable to only the selected page. Note that when "apply to all pages" is selected in the page setting 408, the input settings are collectively applied to all the pages. Note that at this time, the user can recognize the currently selected page when the frame of the sheet region 417 corresponding to the page where "E" is written is highlighted as a page frame 409. In addition, the user can delete the selected page from the edit region 401 by pressing, for example, an icon 410.

Figure 5:
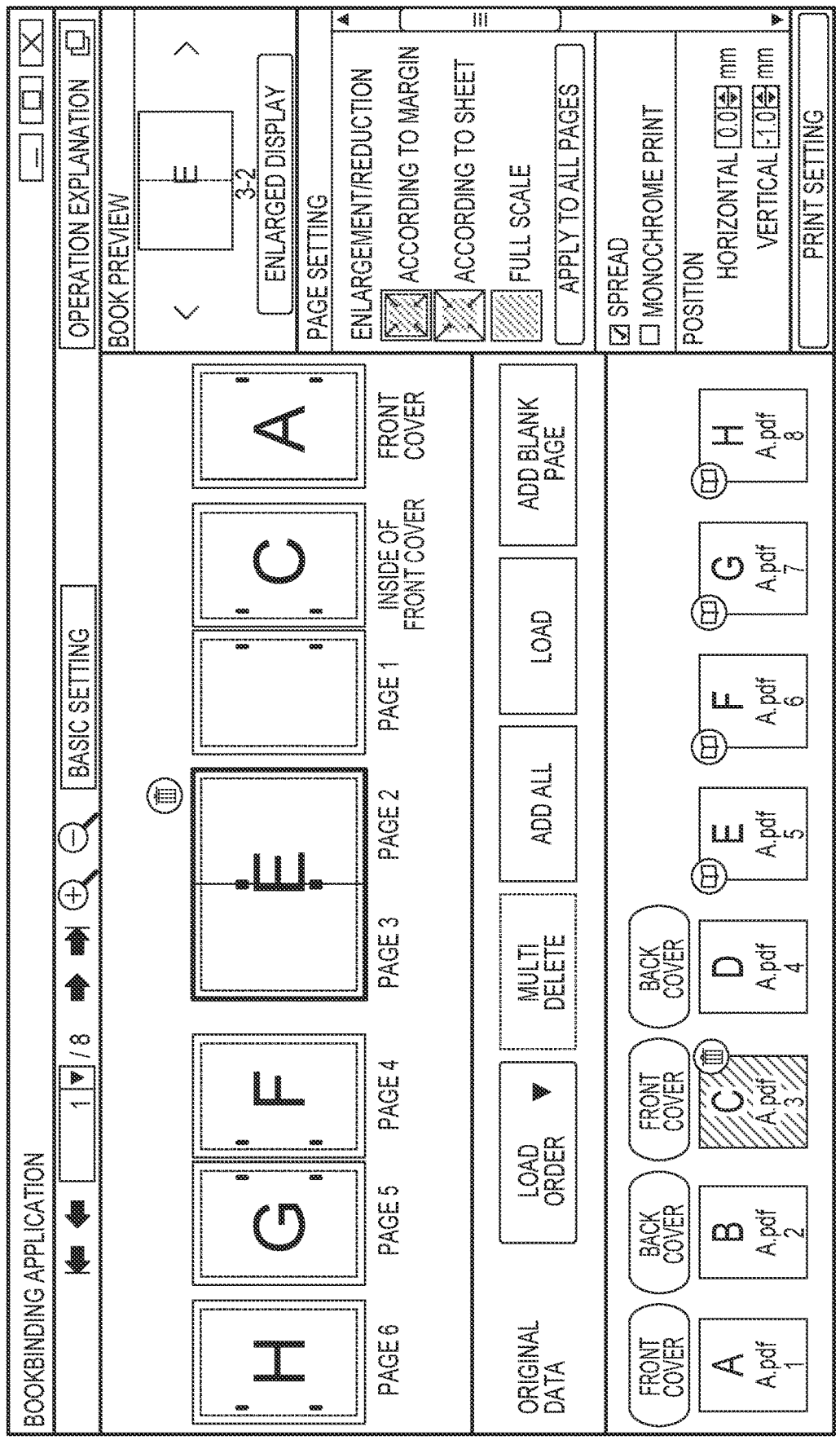
FIG. 5 is a view showing an example of the edit screen in the bookbinding application.

The user can allocate one original data to span two pages by selecting a "spread" checkbox 415. An operation of changing a page forming no double-page spread to a page forming a double-page spread by selecting the "spread" checkbox 415 is called "spreading". FIG. 5 shows a display example when the "spread" checkbox 415 is selected in the state in which the page where an image with "E" written is laid out is selected, as shown in FIG. 4. When the "spread" checkbox 415 is selected, the image laid out on the selected page is laid out to span two pages. If the "spread" checkbox 415 is selected in the state in which an even-numbered page (the right page of a spread for right-side binding or the left page of a spread for left-side binding) of the text is selected, the selected page is displayed at the center of the spread. Then, the pages are reallocated so that the pages after the selected page are shifted backward by one page. That is, in this case, a spread is allocated to one page by adding one page after the selected page.

On the other hand, if an odd-numbered page of the text (the left page of a spread for right-side binding or the right page of a spread for left-side binding), like the page where "E" is written in FIG. 4, is selected, the next page of the selected page forms a spread different from a spread formed by the selected page. Therefore, if only one page is added after the selected page to allocate the one page to a region for two pages, the page cannot be displayed in a spread. Therefore, if, for example, the "spread" checkbox 415 is selected in the state in which the odd-numbered page of the text is selected, as shown in FIG. 5, one page can be added not only after but also before the selected page. This makes it possible to surely allocate the selected page to a spread. Note that in this case, the pages are reallocated so that the pages after the selected page are shifted backward by two pages.

When the "spread" checkbox 415 is selected in the state in which the odd-numbered page is selected, a message for notifying the user that one page is added before the selected page may be displayed. If the user approves addition of the page, processing of performing allocation to a spread may be executed. This can prevent addition of a page unintended by the user. Note that if the user does not approve addition of a page, processing of performing allocation to a spread need not be executed or a space for one page may be added after the selected page to allocate the selected page to the region for two pages. When the "spread" checkbox 415 is selected in the state in which the odd-numbered page is selected, a space for one page may be added after the selected page to allocate the selected page to the region for two pages without displaying the above-described message. Note that when such allocation is performed, a message indicating that the selected page is not printed in a spread may be displayed.

When the "spread" checkbox 415 is cleared after the page is allocated to a spread, the (preceding and succeeding) pages added at the time of allocation of the page to the spread are deleted, and the pages after the pages are reallocated. Note that, for example, a message indicating whether to delete pages such as blank pages added when the odd-numbered page is allocated to the spread may be displayed.

Note that when horizontally long original data is dragged and dropped in the edit region 401 (or allocated automatically), processing of allocating a spread automatically may be performed. In this case, the "spread" checkbox 415 is selected automatically. Furthermore, if the insertion position of this page is an odd-numbered page, a blank page or the like may be inserted (added) before the page, as described above, or predetermined error display or the like may be performed. When, after the horizontally long page is allocated to the spread, the "spread" checkbox 415 is cleared, the allocation to the spread is released and the horizontally long page can be allocated to one-side page (for example, by reduction or rotation). Note that the horizontally long page may be allocated to one-side page, similarly to a vertically long page without automatically allocating the horizontally long page to the spread. Referring back to FIG. 4, with respect to the selected page, an image of the spread including the page after printing is displayed as a booklet preview 411, and thus the user can readily recognize the state of the selected page after completion of the booklet. Note that when "<" or ">" in the preview is selected, a preview of an adjacent spread between adjacent pages can be displayed. At this time, the selected page may move together, or only the pages of the preview may move without synchronizing the selected page and the preview with each other.

As described above, the user can operate the data expanded in the original data region 402 for each page by manual page allocation. FIG. 4 shows a state in which the original data representing an image in which "C" is written is selected from the data expanded in the original data region 402. If the thus selected original data is dragged and dropped in an arbitrary position of the edit region 401, it is allocated to a page corresponding to the dropped position. For example, if the original data representing an image in which "C" is written is dragged and dropped in a predetermined area, in the edit region 401, between the page where "F" is written and the page where "G" is written, the page where "C" is written is inserted between the page of "F" and the page of "G". Note that if such page is inserted, the page numbers and the spread relationship are reconstructed accordingly. That is, the number of the page where "C" is written becomes the number of the page where "G" is written before insertion, and the numbers of the pages after the page where "G" is written are shifted backward by one. The page of "F" and the newly added page of "C" have the spread relationship, and the page of "G" has the spread relationship with the page of "H" due to addition of the page of "C".

Furthermore, the user can add a blank page by pressing an "add blank page" button 412. In this embodiment, the blank page indicates a page to which the original data selected by the user is not allocated, that is, a page where an image based on the original data selected by the user is not laid out. For example, if the "add blank page" button 412 is pressed in the state in which the page where "C" is written is selected in the edit region 401, a blank page is added between the page where "C" is written and the page where "E" is written. A blank page may be added to the right or left side of the selected page in accordance with a predetermined rule or, if two pages are selected, may be added between the two pages. Thus, a blank page can be added to an arbitrary position in the booklet in accordance with the user's preferences, for example, a preference for setting the back surfaces of the covers blank.

Note that if each data in the original data region 402 is allocated to a page in the edit region 401, information for specifying it is added at the upper left position of each data in the original data region 402. Referring to FIG. 4, for example, an icon indicating allocation to the front cover is added to each of the original data representing an image in which "A" is written and the original data representing an image in which "C" is written. This allows the user to recognize that, for example, data to be allocated to a page in the booklet is not allocated, data not to be allocated to a page in the booklet is unwantedly allocated, or whether the data allocated to the cover is appropriate. The user can delete data not to be used for creation of the booklet in the original data region 402. For example, the user can select an icon 413 displayed at the upper right position of the data in the selected state to delete the selected data from the original data region 402. This can prevent an edit operation from becoming cumbersome due to the existence of many data not to be used in the original data region 402.

Furthermore, in the original data region 402, it is possible to select a plurality of data and collectively operate them. For example, when the original data representing an image in which "C" is written and the original data representing an image in which "D" is written are collectively selected and are collectively dragged and dropped in the edit region 401, these data can be allocated to two successive pages. The same applies to a case in which three or more data are selected. Furthermore, if a "multi delete" button 414 is pressed in a state in which a plurality of data are selected, the plurality of data can collectively be deleted from the original data region 402. Note that if one data is selected or no data is selected, the "multi delete" button 414 can be disabled, for example, grayed out.

Upon completion of editing of the booklet, as described above, the user can execute printing of each page displayed in the edit region 401 by pressing a print setting button 416. Note that in the state in which the print setting of side stitch (1-in-1) is made, when n is an integer of 1 or more, double-sided printing is executed so that the (2n−1)th page and 2nth page have the front-back relationship. Note that double-sided printing is executed so that the front cover and its back surface have the front-back relationship and the back cover and its back surface have the front-back relationship.

[Case in which Saddle Stitch is Selected and Covers and Text are Created by Same Type of Sheets]

Figure 6:
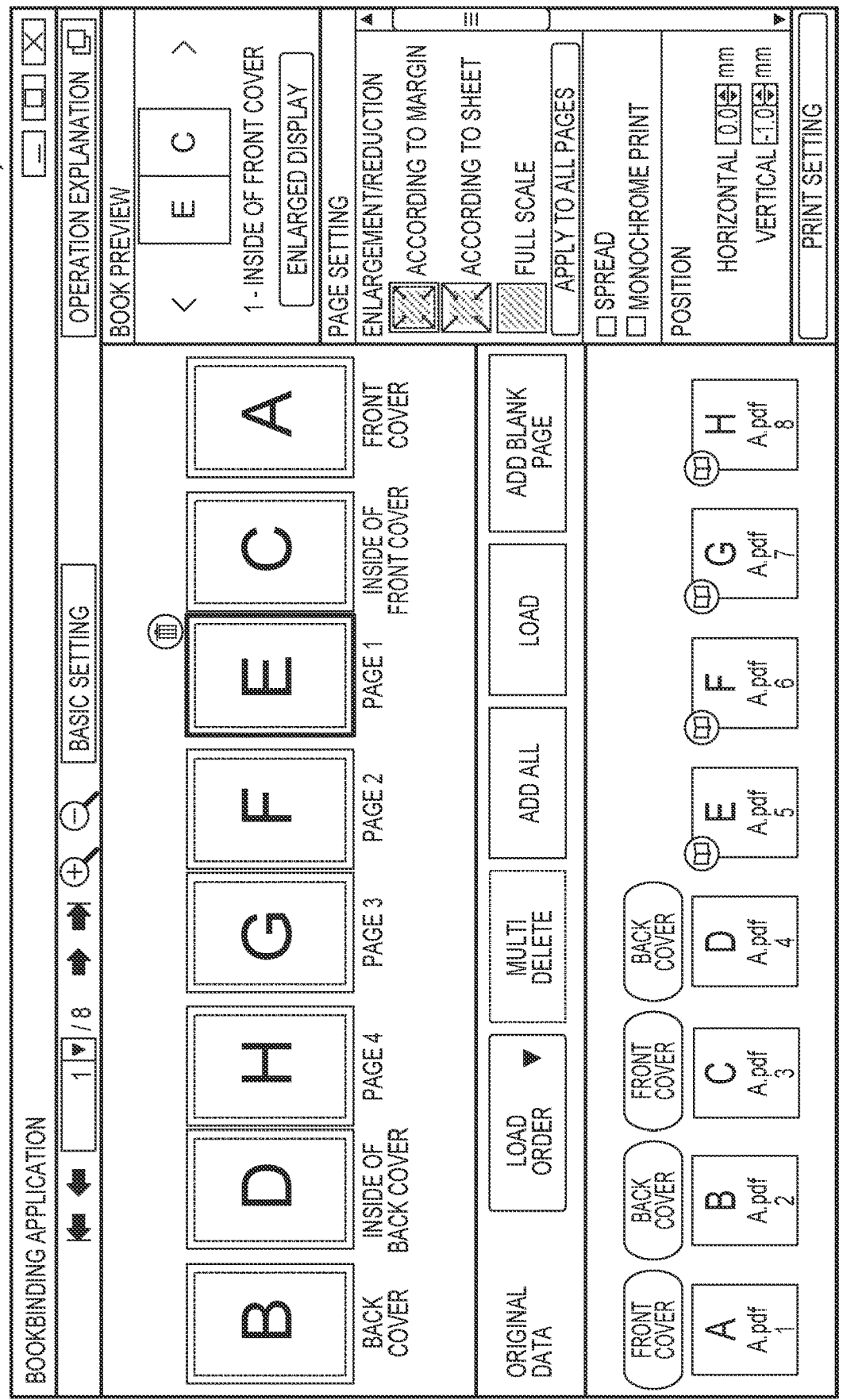
FIG. 6 is a view showing an example of the edit screen in the bookbinding application.

Subsequently, an example of the edit screen when the binding method is saddle stitch (2-in-1), and the setting of using the same type of sheets for the covers and text is made will be described with reference to FIG. 6. The edit screen in this case is almost the same as that shown in FIG. 4. However, in the case of saddle stitch, the binding positions are between the pages, and thus the marks indicating the binding positions need not be displayed, as shown in a screen example 600 of FIG. 6. Note that when printing on a paper surface, the marks indicating the binding positions may or may not be displayed at predetermined positions between the pages. Furthermore, for example, the mark indicating the binding positions may be printed at positions that can be seen when being output as a booklet, instead of being printed on all the sheets.

Note that if the binding method is saddle stitch (2-in-1), 2-in-1 double-sided printing is executed, and thus the number of pages per sheet is four. Therefore, if the number of pages added to the edit region 401 is not a multiple of 4, a page such as a blank page can be automatically added to the end so that the total number of pages is a multiple of 4. Note that a blank page is added when, for example, the edit screen is displayed, a page is added during display of the edit screen, a preview screen is displayed, or a print instruction is executed to generate print data.

Note that in the state in which the binding method is saddle stitch (2-in-1) and the print setting of right-side binding is made, the front surface of one sheet including the (N/2+2m+2)th page on the right side and the (N/2−2m−1)th page on the left side is printed. In the above relationship, N represents the total number of pages and m is an integer of 0 or more. Then, the back surface of the sheet including the (N/2−2m)th page on the right side and the (N/2+2m+1)th page on the left side is printed. If, for example, N=8, the front surface including the sixth page on the right side and the third page on the left side and the back surface including the fourth page on the right side (the back side of the third page) and the fifth page on the left side (the back side of the sixth page) undergo double-sided printing. Similarly, the front surface including the eighth page on the right side and the first page on the left side and the back surface including the second page on the right side (the back side of the first page) and the seventh page on the left side (the back side of the eighth page) undergo double-sided printing. The front surface on which the back cover is laid out on the right side and the front cover is laid out on the left side and the back surface on which the back surface of the front cover is laid out on the right side and the back surface of the back cover is laid out on the left side undergo double-sided printing. Note that the same applies to left-side binding except that the above relationship between the right and left sides is reversed.

[Case in which Side Stitch is Selected and Covers and Text are Created by Different Types of Sheets]

Figure 7:
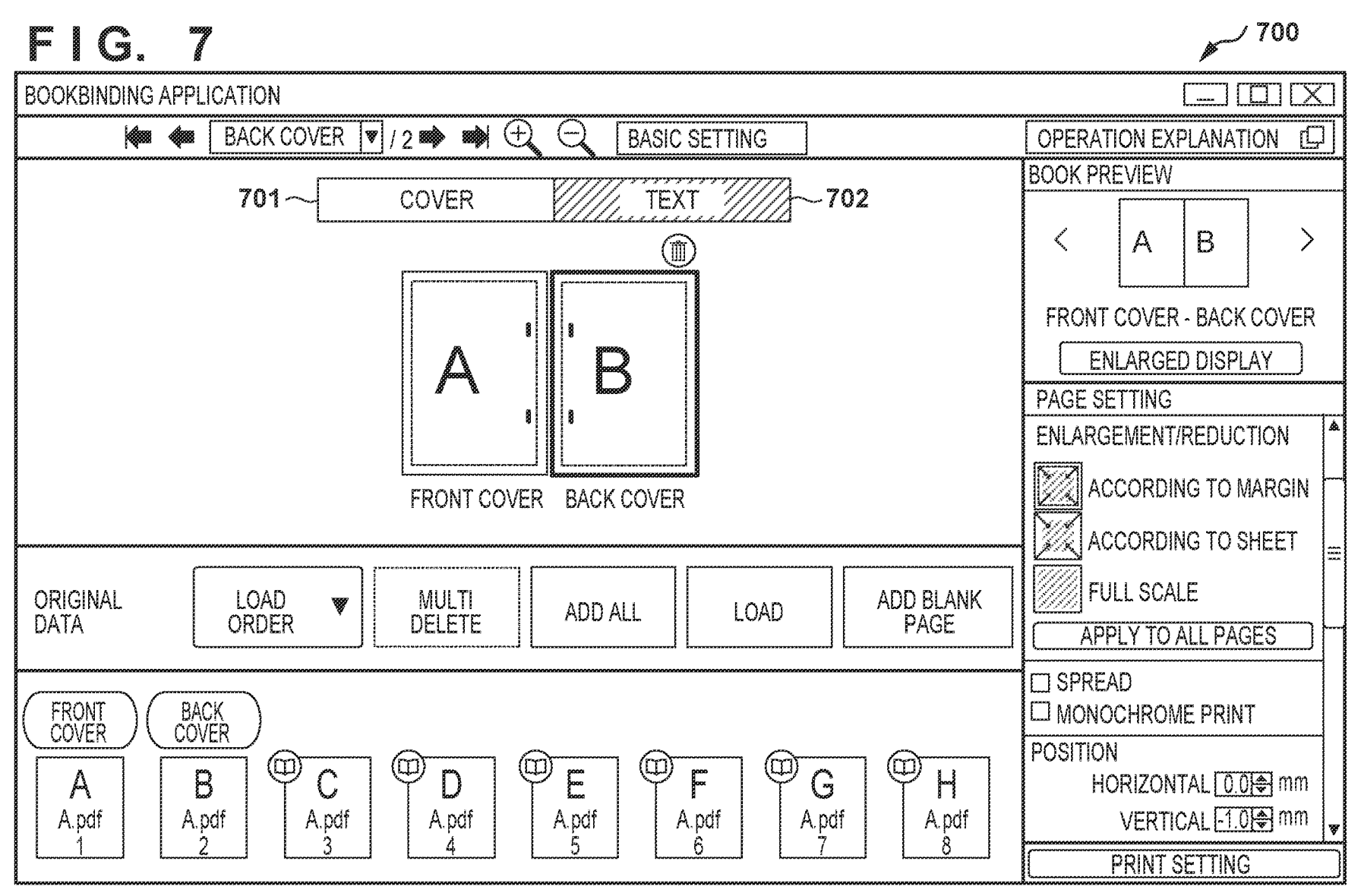
Figure 8:
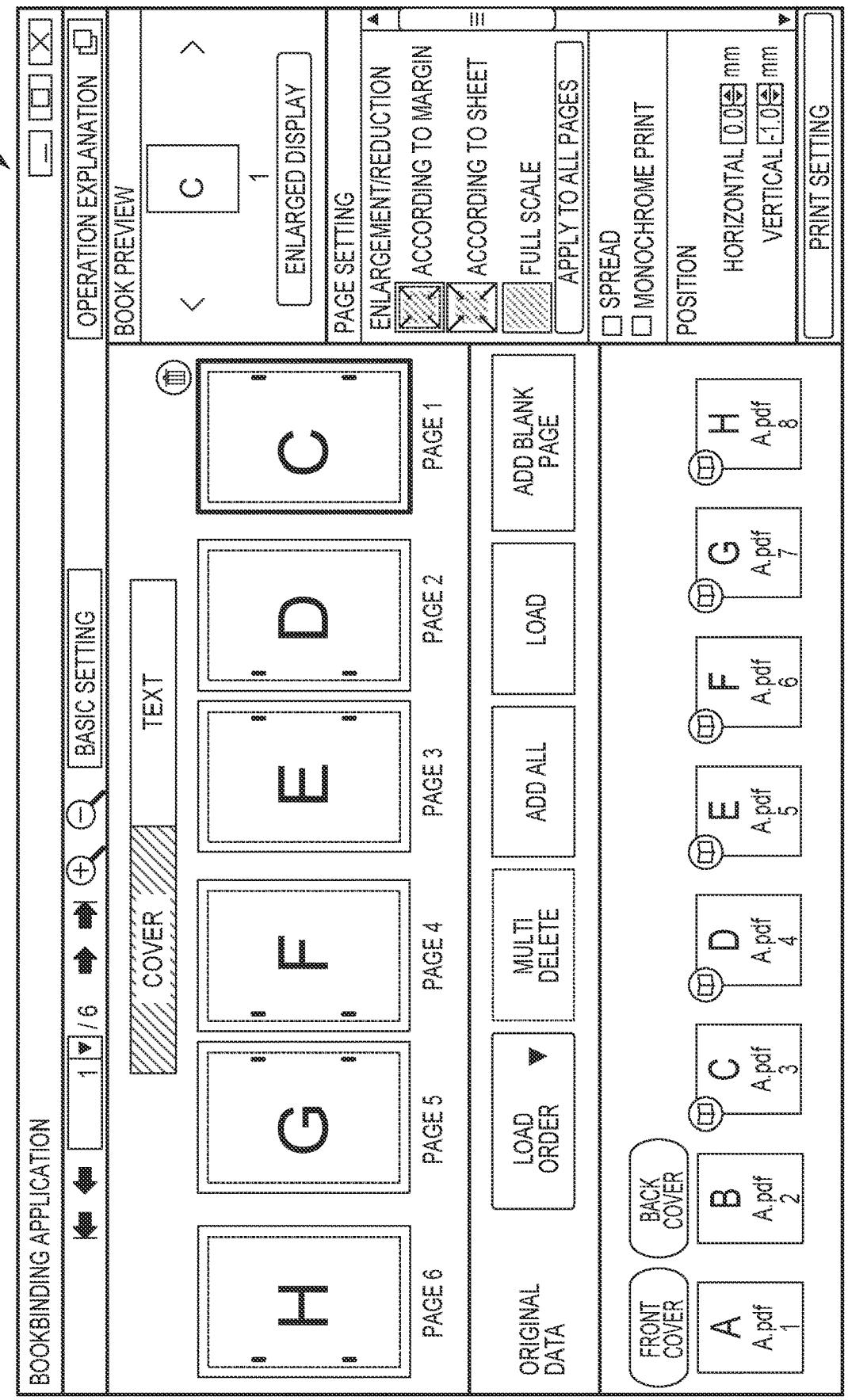
FIG. 8 is a view showing an example of the edit screen in the bookbinding application.

Subsequently, an example of the edit screen when the binding method is side stitch (1-in-1) and the setting of using different types of sheets for the covers and text is made will be described with reference to FIGS. 7 and 8. When different types of sheets are used for the covers and text, a cover edit screen 700 shown in FIG. 7 and a text edit screen 800 shown in FIG. 8 are used. Note that this form need not always be used but at least the screen is configured to execute printing of the covers and text independently. If the cover edit screen 700 and the text edit screen 800 are separated, buttons for switching between the edit screens, for example, a cover selection button 701 and a text selection button 702 in FIG. 7 are displayed in the edit region 401. When the user selects the cover selection button 701, the cover edit screen 700 shown in FIG. 7 is displayed. When the user selects the text selection button 702, the text edit screen 800 shown in FIG. 8 is displayed. Note that these buttons may be displayed outside the edit region 401. Instead of the form of the button, for example, a tab form may be used. That is, a tab for the cover edit screen and a tab for the text edit screen may be displayed, and one of the tabs may be selected to switch the screen.

In the cover edit screen, only the front cover and the back cover are displayed, as shown in FIG. 7. Note that the front cover and the back cover are displayed in a form when viewing the booklet from the spine side. That is, for right-side binding, the front cover is displayed on the left side and the back cover is displayed on the right side. On the other hand, for left-side binding, the front cover is displayed on the right side and the back cover is displayed on the left side. If side stitch is used, binding positions are displayed. However, in the cover edit screen, the binding positions are displayed on the center side when the front cover and the back cover are laid out side by side, as shown in FIG. 7. In the cover edit screen 700, the positional relationship between the front cover and the back cover is reversed, as compared with the edit screen, shown in FIG. 4 or 6, in which the covers and the text are collectively edited. This display allows the user to readily recognize how the booklet after printing looks like from the spine side when the booklet is opened.

Note that in this embodiment, if different types of sheets are used for the covers and text, the back surface of the front cover or that of the back cover is not used (that is, the back surface is blank). The present invention, however, is not limited to this. If the back surface of the front cover or that of the back cover is used, the cover edit screen displays, for example, the back surface of the front cover adjacent to the front cover and the back surface of the back cover adjacent to the back cover. In the example of FIG. 7, the back surface of the front cover can be displayed on the left side of the front cover and the back surface of the back cover can be displayed on the right side of the back cover.

As shown in FIG. 8, in the text edit screen, the text except for the front cover and the back cover (and their back surfaces) is displayed in the edit region. The edit screen shown in FIG. 8 is the same as that shown in FIG. 4 except that the front cover, the back cover, and their back surfaces are not included.

[Case in which Saddle Stitch is Selected and Covers and Text are Created by Different Types of Sheets]

The edit screen when saddle stitch is selected and the setting of using different types of sheets for the covers and text is made is the same as that shown in FIG. 7 or 8 except that the marks of the binding positions are not displayed. Note that for saddle stitch, the number of pages needs to be a multiple of 4, as described above. However, if different types of sheets are used for the covers and text, the number of pages of the text needs to be a multiple of 4. That is, in the above-described example, adjustment is performed so that the total number of pages of the covers and text is a multiple of 4. In this example, however, adjustment is performed so that the number of pages of only the text is a multiple of 4. As a result, in this example, if the back surfaces of the covers undergo single-sided printing, the total number of pages of the covers and text is not a multiple of 4 (when a is an integer, the total number of pages is given by (4a+2)). For example, if an edit operation is performed so that the text includes data for six pages, 2 blank pages or the like is inserted so that the number of pages of the text is a multiple of 4. Note that the page inserted at this time is not limited to a blank page, and may be a page including a fixed phrase, fixed figure, or fixed pattern.

Figure 9:
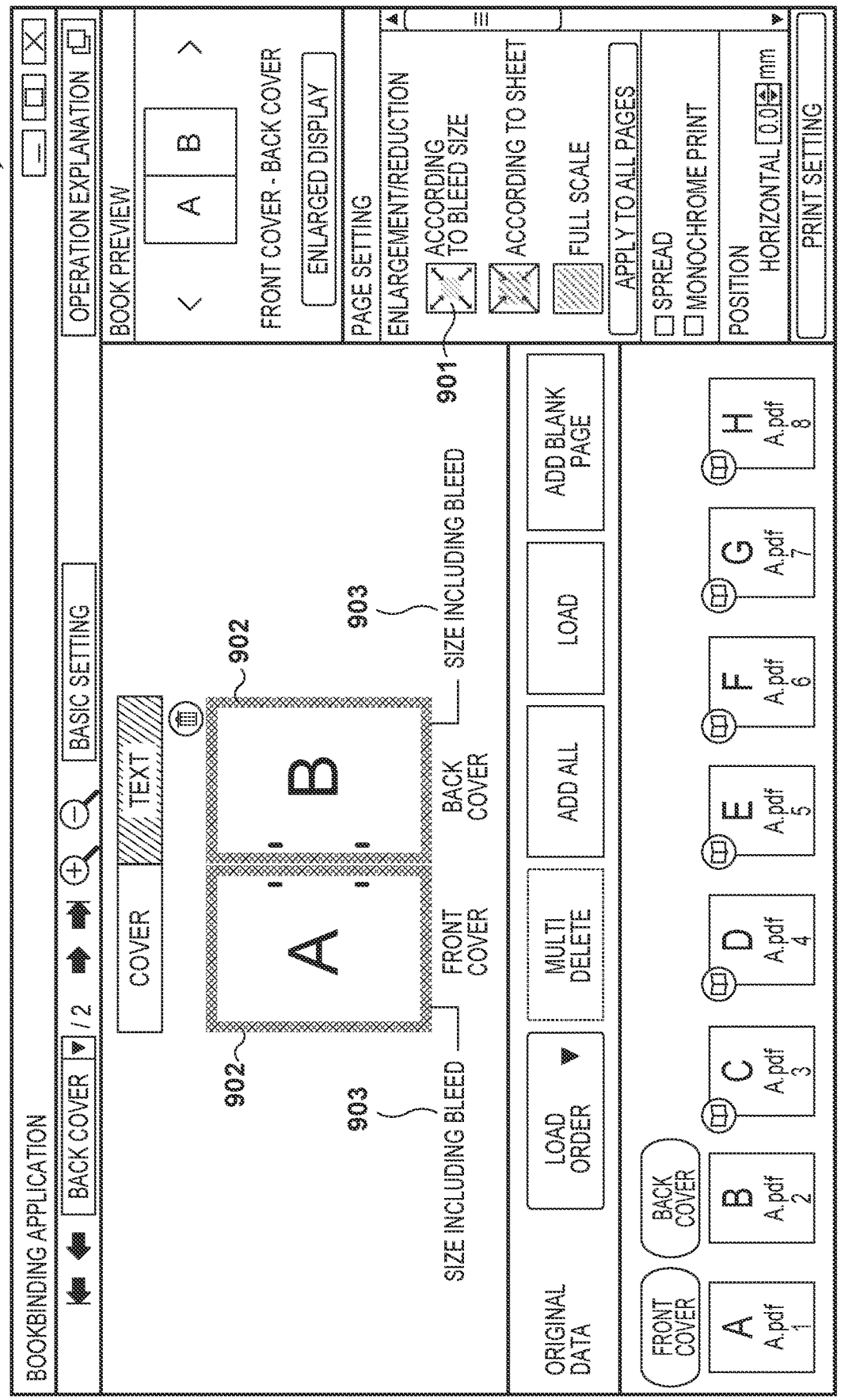
FIG. 9 is a view showing an example of the edit screen in the bookbinding application.

Note that it is possible to execute borderless printing by using paper (for example, glossy paper) except for normal paper. FIG. 9 shows an example of the edit screen in this case. Note that if the setting of using different types of sheets for the covers and text is made, the cover edit screen and the text edit screen are displayed independently. Display of one of the cover edit screen and the text edit screen can be switched by selecting the tab included in each edit screen. FIG. 9 shows an example of the cover edit screen in the state in which borderless print setting is made. When executing borderless printing, so-called "bleed" as processing of performing control so that a print target image has a size in at least one of width and height larger than that of a sheet on which printing is executed needs to be performed. Therefore, if paper such as glossy paper that can undergo borderless printing is selected, a print region 902 of a size including bleed and an explanation 903 can be displayed. Furthermore, an option 901 used to enlarge/reduce an image based on original data in accordance with a size including bleed is displayed. This allows the user to create covers by borderless printing by only performing a simple operation.

Upon completion of the edit processing using the screens shown in FIGS. 4 to 9, the user selects a print setting button included in each of these screens. The user performs further print setting processing using a print setting screen selected by selecting the print setting button, thereby selecting print execution. This processing sends application data generated by the bookbinding application to the printer driver corresponding to the printer selected in FIG. 3, and the printer driver generates print data based on the application data. Note that if the covers and text are printed on the same type of sheets, the application data includes pages laid out in the covers and pages laid out in the text. That is, the pages laid out in the covers and the pages laid out in the text are printed using the print data based on the application data. On the other hand, if the covers and text are printed on the different types of sheets, the pages laid out in the covers and the pages laid out in the text are printed independently. Therefore, the above-described print setting screen prepares an option for selecting the covers or the text as a print target. In this case, if the user instructs printing in the state in which the covers are selected, the application data includes only pages laid out in the covers, and the printer driver generates print data for the covers. On the other hand, if the user instructs printing in the state in which the text is selected, the application data includes only pages laid out in the text, and the printer driver generates print data for the text.

First Embodiment

[Staples and Layout of Image]

Figure 10A:
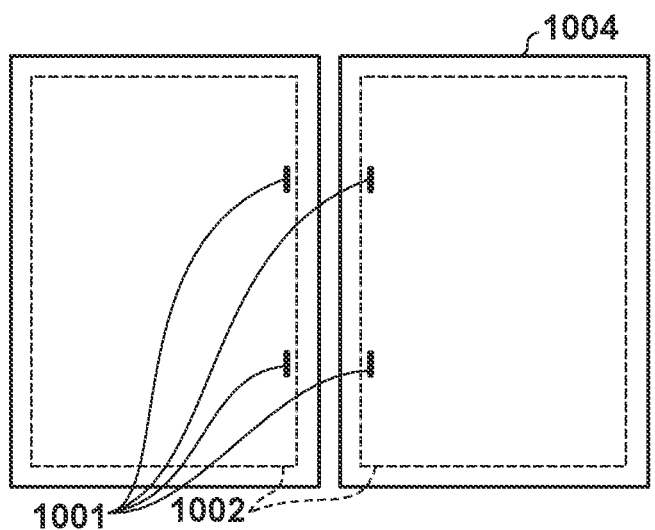
FIGS. 10A, 10B and 10C are views for explaining the positions of staples and the layout of an image.
Figure 10B:
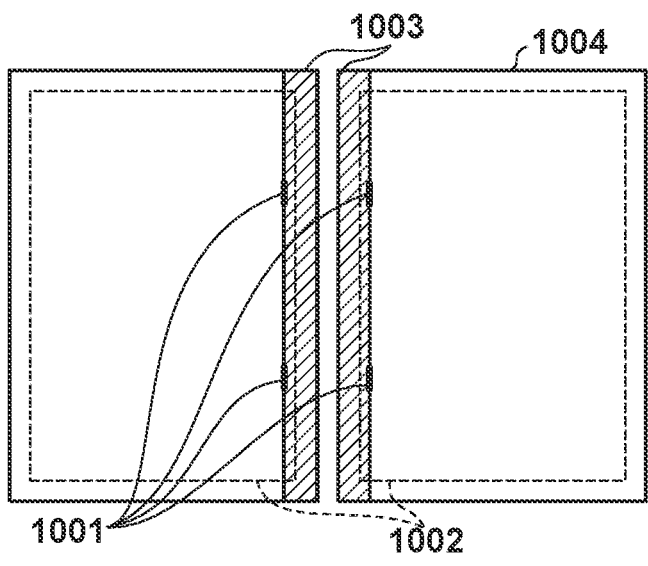
Figure 10C:
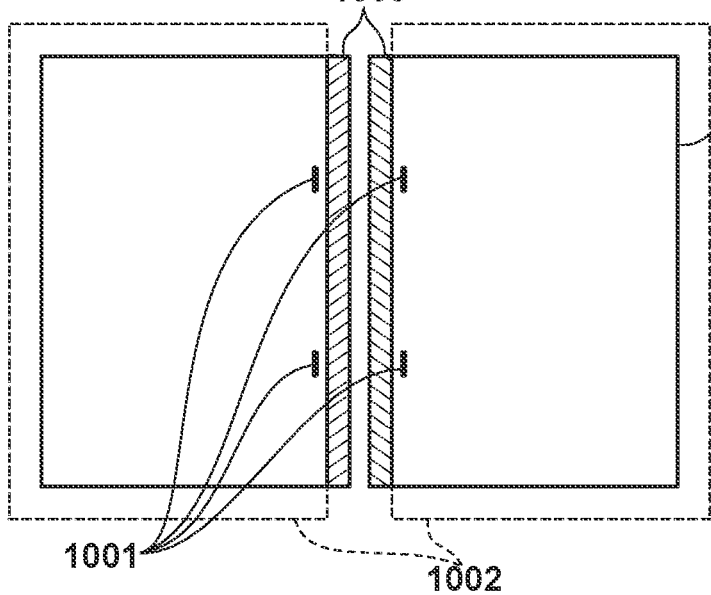

Binding positions and the layout of an image according to this embodiment will be described. FIGS. 10A to 10C show a pair of pages displayed in an edit region 401 of a bookbinding application 201 described above. The pair of pages shown in FIGS. 10A to 10C has the spread relationship. That is, although the numbers of the two pages are successive, the pages are printed not on the back and front surfaces of one sheet but on different sheets. For pages shown in FIG. 10A, "side stitch" is set as the binding setting, and binding positions 1001 are displayed in sheet regions 1004. In addition, each boundary 1002 indicates the boundary between a printable region and a margin region. That is, each boundary 1002 indicates the size of the print region.

In FIG. 10B, a region 1003 is a region that is not visually perceived by the user when printed materials on which the pages are printed are printed as a booklet by performing stapling at the binding positions 1001. That is, when the booklet is opened, the user cannot see the portion of the region 1003. Therefore, when an image is laid out in the region 1003, a region of the image, that is included in the region 1003, is hidden. In FIG. 10B, since the region 1003 is included in the print region, the user unwantedly recognizes the region 1003 as a visually receivable region when the printed materials are bound as a booklet, and may lay out the image in the region 1003. Therefore, when deciding the layout of the image, it is necessary to perform adjustment so the image is not laid out in the region 1003. Note that the region 1003 is a region including at least a partial region in the print region between the binding positions 1001 and the side of the boundary 1002 on the side of the binding positions 1001.

In this embodiment, the user is notified that the image is laid out in the region 1003 which is hidden when performing printing as a booklet. This prevents a situation in which the image is printed while being laid out in the region 1003 and a print result whose user satisfaction becomes low when a booklet is printed is obtained.

In FIG. 10C, a view shows each region at the time of borderless printing. In borderless printing, it is preferable to set a print region to include the binding positions 1001 in order to prevent occurrence of white streaks at the central portion of the spread. Thus, at the time of bordered printing, if the image is included even slightly in the region inside the binding positions, a notification is made. However, at the time of borderless printing, the present invention is not limited to this. That is, at the time of borderless printing, if an image is included in the region (the region 1003 in FIG. 10C) inside (on the spine side) the binding positions 1001 and outside the print region, a notification is made.

Note that in the following description, the spine side (for example, the central side of the spread in the example of FIGS. 10A to 10C) with respect to the binding positions will be referred to as "inside" the binding positions. Therefore, in this embodiment, if an image is printed inside the binding positions, the recording material may be wastefully consumed, and thus the print region is specified so the image is not laid out inside the binding positions. In this embodiment, if the image is laid out inside the binding position, the quality of the printing product may degrade, and a notification is made in a state in which the user can recognize it.

[Processing Procedure]

Figure 11:
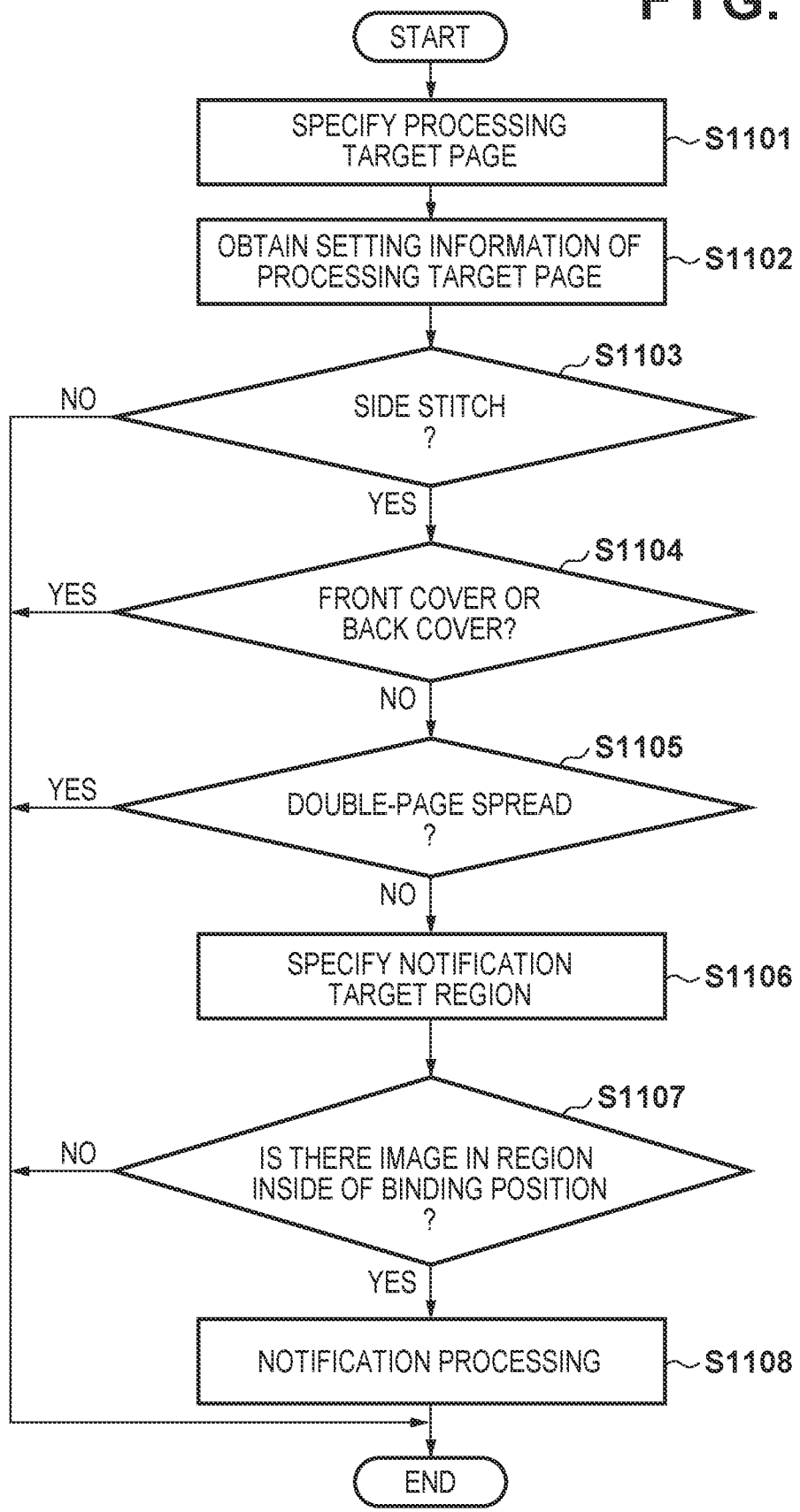
FIG. 11 is a flowchart of processing according to the first embodiment.

Processing according to this embodiment will be described with reference to FIG. 11. A processing procedure shown in FIG. 11 is implemented when a CPU 103 of an information processing apparatus 101 on which the bookbinding application 201 operates reads out a program corresponding to the bookbinding application 201 from an external storage device 106 or the like and executes it. This processing is appropriately executed when the user makes settings for each printing product using the bookbinding application 201.

In step S1101, the CPU 103 specifies a processing target page. When this processing is executed upon detecting that an image is laid out on one of pages shown displayed in the edit region 401, the page on which the image is laid out is specified as a processing target page. The layout of the image may be change of the layout position of the already laid out image or layout of a new image. Note that the image is laid out upon receiving designation of the layout position of the image from the user. When the processing is executed upon receiving change of the page (edit target page) of interest in the edit region 401, the page of interest before the change is specified as a processing target page. The page of interest indicates a page, indicated by a page frame 409 in FIG. 4, in which, for example, the current layout of the image is adjusted. For example, the page of interest can be changed by a click operation, a scroll operation, or the like on the edit region 401 by the user, and display of the page frame is changed accordingly.

In step S1102, the CPU 103 obtains setting information of the processing target page. The setting information obtained at this time includes, for example, setting information concerning the binding method, setting information concerning whether the page is the front cover or the back cover, setting information concerning whether bordered or borderless printing is set, setting information concerning whether the page forms a double-page spread, and setting information concerning the binding positions. Examples of the binding method are "saddle stitch" and "side stitch".

In step S1103, the CPU 103 determines whether the set binding setting is side stitch. If the binding setting is side stitch (YES in step S1103), the process advances to step S1104; otherwise (for example, saddle stitch) (NO in step S1103), the processing procedure ends. In this case, the process may stand by for reception of a further user operation in the bookbinding application 201. That is, in this embodiment, even if a page image to undergo side stitch printing is laid out, notification processing (to be described later) is not executed. A side stitch booklet includes no region that cannot be visually perceived by the user when the booklet is bound.

In step S1104, the CPU 103 determines whether the processing target page is the front cover or the back cover. If the CPU 103 determines that the processing target page is the front cover or the back cover (YES in step S1104), the processing procedure ends. That is, in this embodiment, even if the image is laid out in the processing target page that is the front cover or the back cover, the notification processing (to be described later) is not executed. This is because the front cover or the back cover includes no region that cannot be visually perceived by the user when the booklet is bound. If other settings are determined (NO in step S1104), the process advances to step S1105.

In step S1105, the CPU 103 determines whether the processing target page forms a double-page spread. Note that in a default state in which the edit screen is not displayed and the user does not input the setting of a double-page spread, all the pages do not form double-page spreads. If the CPU 103 determines that the processing target page forms a double-page spread (YES in step S1105), the processing procedure ends. That is, in this embodiment, even if an image is laid out in the double-page spread, the notification processing (to be described later) is not executed. This is because if an image is laid out in a double-page spread, the image is divided at binding positions, the divided images are automatically controlled so as to be included respectively in the print regions of two pages included in the double-page spread. If the processing target page does not form a double-page spread (NO in step S1105), the process advances to step S1106.

In step S1106, the CPU 103 specifies a notification target region. As described above, at the time of bordered printing, when the image is laid out inside the binding positions 1001, the notification processing is performed. Therefore, the notification target region is a region inside the binding positions 1001 in the sheet region 1004. On the other hand, at the time of borderless printing, when the image is laid out in a region inside the binding positions 1001 and outside the print region, the notification processing is performed. Therefore, the notification target region is a region inside the binding positions 1001 and outside the print region in the sheet region. Thus, the CPU 103 determines whether the bordered setting is set for the processing target page, and specifies the notification target region in accordance with the determination result.

In step S1107, the CPU 103 determines whether the image is laid out in the notification target region. If the CPU 103 determines that the image is not laid out in the notification target region (NO in step S1107), the processing procedure ends without executing the notification processing (to be described later). On the other hand, if the image is laid out in the notification target region (YES in step S1107), the process advances to step S1108.

In step S1108, the CPU 103 executes the notification processing. More specifically, the CPU 103 displays a warning on the screen to notify that the image is laid out in the notification target region. A display example will be described later with reference to FIG. 12. Then, the processing procedure ends. After that, the CPU 103 stands by until a further user operation is performed.

In the above processing procedure, the setting information of the processing target page is obtained every time layout of an image is detected. However, for example, an arrangement may be adopted in which the setting information is obtained in advance and is obtained again when the setting of the binding method or the setting of the binding positions is changed.

Note that in this embodiment, the notification processing is executed when the laid out image extends outside the print region and is included in a region inside the binding positions. In this embodiment, even if the laid out image extends outside the print region, if the image is not included in a region inside the binding positions, the notification processing is not executed. That is, for example, even if the image extends from the upper side or the lower side of the print region in FIGS. 10A to 10C, the notification processing is not executed.

[Warning Screen]

Figure 12:
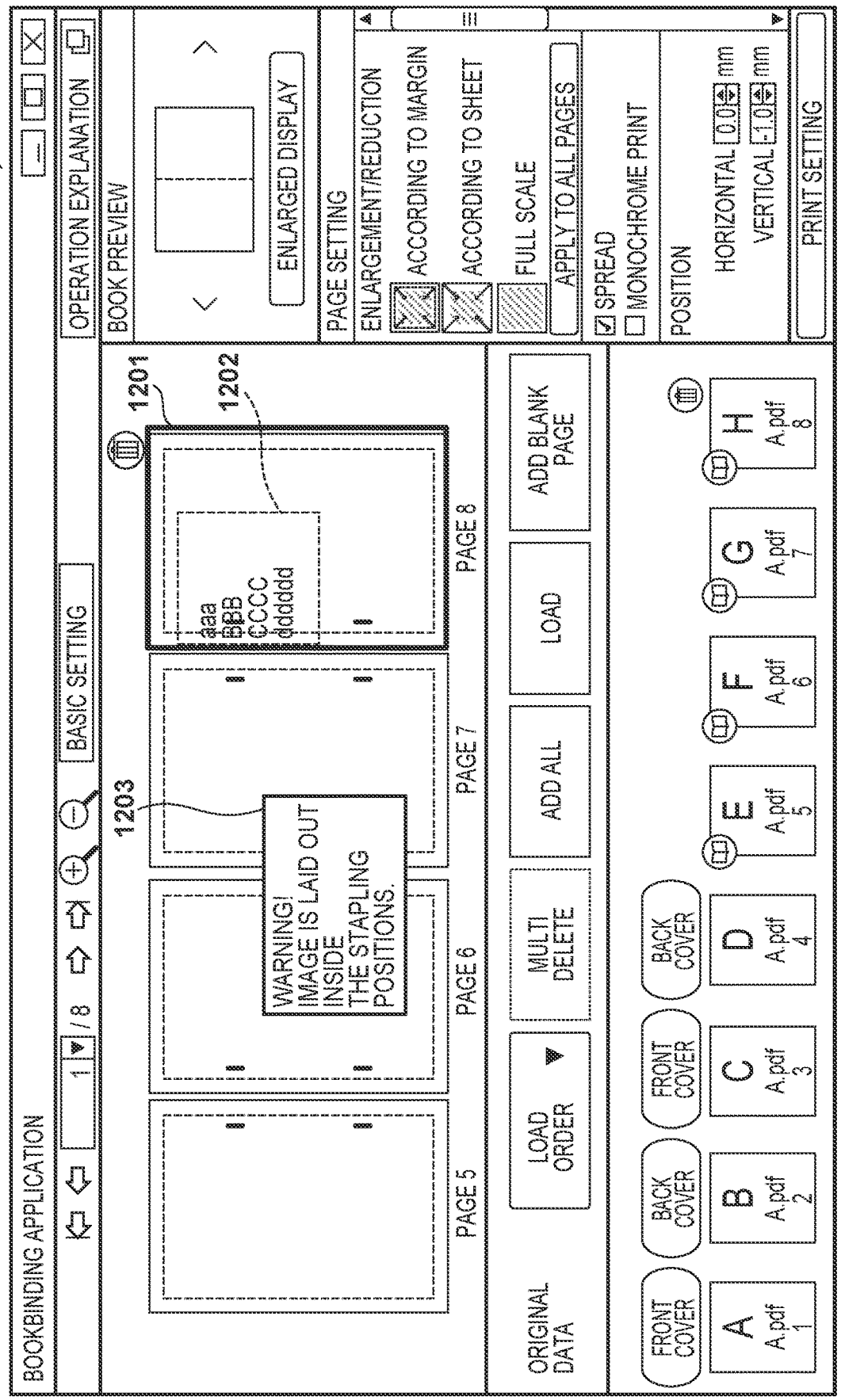
FIG. 12 is a view showing an example of a warning screen according to the first embodiment.

FIG. 12 is a view showing an example of a warning screen (notification screen) displayed upon detecting that an image is laid out on one of the pages displayed in the edit region 401. In a display screen 1200 of the bookbinding application 201, an image 1202 is laid out inside the binding positions in a page 1201 (in this example, page 8) of interest. At this time, the bookbinding application 201 displays a warning screen 1203 to indicate that if printing is executed with this setting, the quality of the printing product may degrade. The warning screen 1203 may be a pop-up screen or may be configured to be displayed as a message in a predetermined region. Contents of the message are not limited to those shown in FIG. 12, and another message may be displayed.

Figure 14:
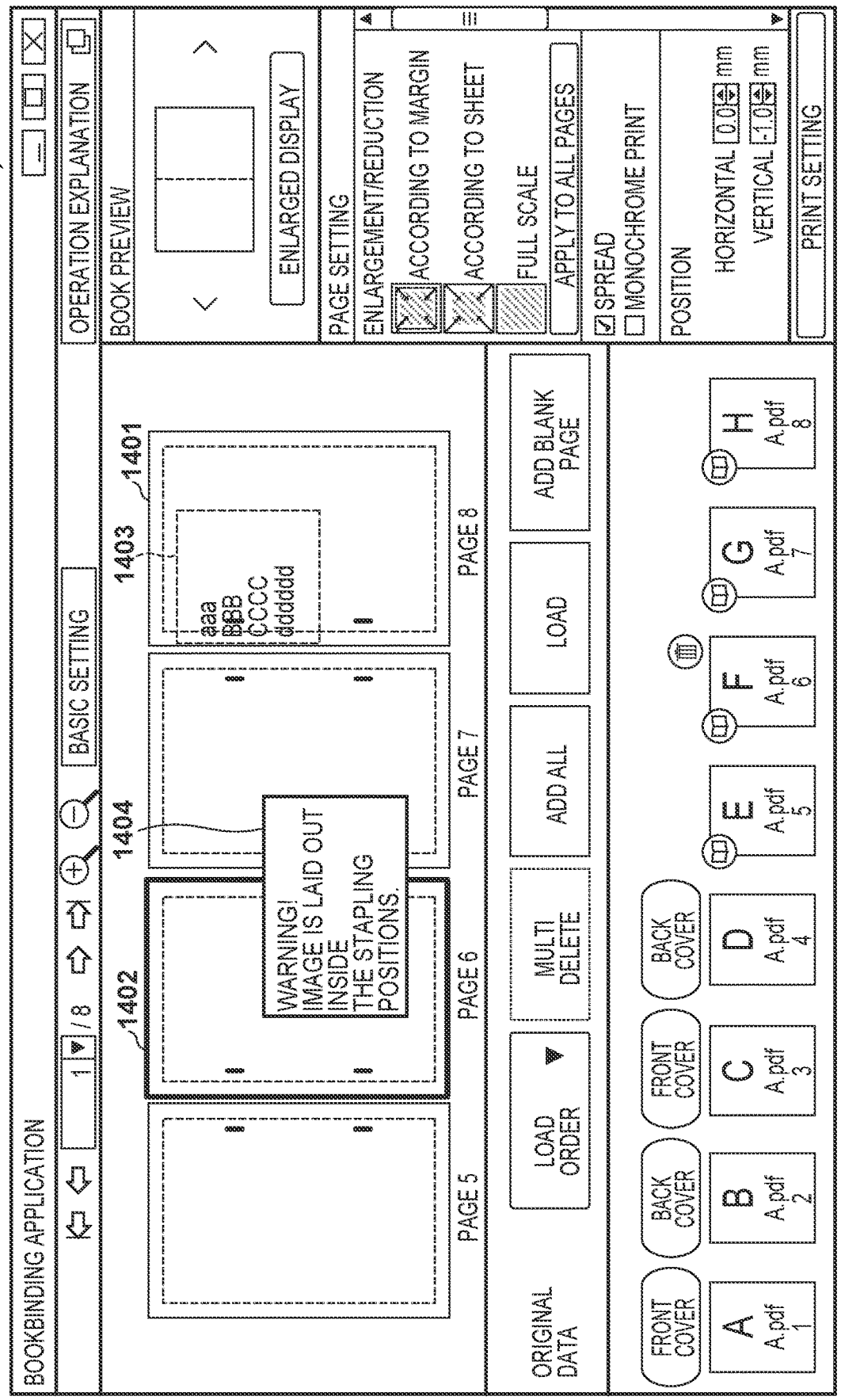
FIG. 14 is a view showing another example of the warning screen according to the first embodiment.

FIG. 14 is a view showing another example of the warning screen displayed upon receiving change of the page of interest in the edit region 401. Assume that in a display screen 1400 of the bookbinding application 201, the page of interest is changed from a page 1401 (in this example, page 8) to a page 1402 (in this example, page 6). In this case, in the page 1401 as the page of interest immediately before, an image 1403 is laid out inside the staples. At this time, the bookbinding application 201 displays a warning screen 1404 to indicate that if printing is executed with this setting, the quality of the printing product may degrade.

Note that this embodiment may adopt an arrangement in which information (for example, a page number) of the page (in FIG. 14, the page 1401) immediately before may also be displayed in the warning screen 1404. Furthermore, an arrangement may be adopted in which the page (in the above example, page 8) for which the warning is displayed may be highlighted to be readily visually perceived. For example, the corresponding page may be indicated by a frame with a color and shape different from those of the page frame 409, or the color of the page itself may be changed and displayed. Alternatively, an icon or the like indicating the position of the corresponding page may be displayed in the edit region 401 or an original data region 402 of an edit screen 400 shown in FIG. 4.

As described above, according to this embodiment, it is possible to prevent printing from being executed so as to include an image designated by the user in a region that cannot be visually perceived by the user after printing.

Note that the user who recognizes that he/she will not be able to see an image laid out inside the binding positions may lay out the image to extend inside the binding positions on purpose. Thus, in this embodiment, if a print instruction is issued even though the warning screen is displayed, printing is executed in accordance with the setting state when the print instruction is issued.

Note that the above example has exemplified an image as an example laid out inside the binding positions but may include, as targets, various objects that can be laid out in pages, such as a text object.

In addition, the above example has exemplified "side stitch" as the binding setting. The present invention, however, is not limited to this. For example, the same processing can be performed when the binding setting is "upper binding". That is, an arrangement may be adopted in which a region where an image is hidden is specified in a printing product based on the positional relationship between the spine and the binding positions of upper binding.

Second Embodiment

In the first embodiment, at the timing of editing of an image, it is determined whether the image is laid out inside the staples, and then whether to display a warning is controlled. In this embodiment, a form of performing the above determination processing at the timing of issuing a print instruction will be described. Note that a detailed description of the arrangement which overlaps the first embodiment will be omitted.

[Processing Procedure]

Figure 13:
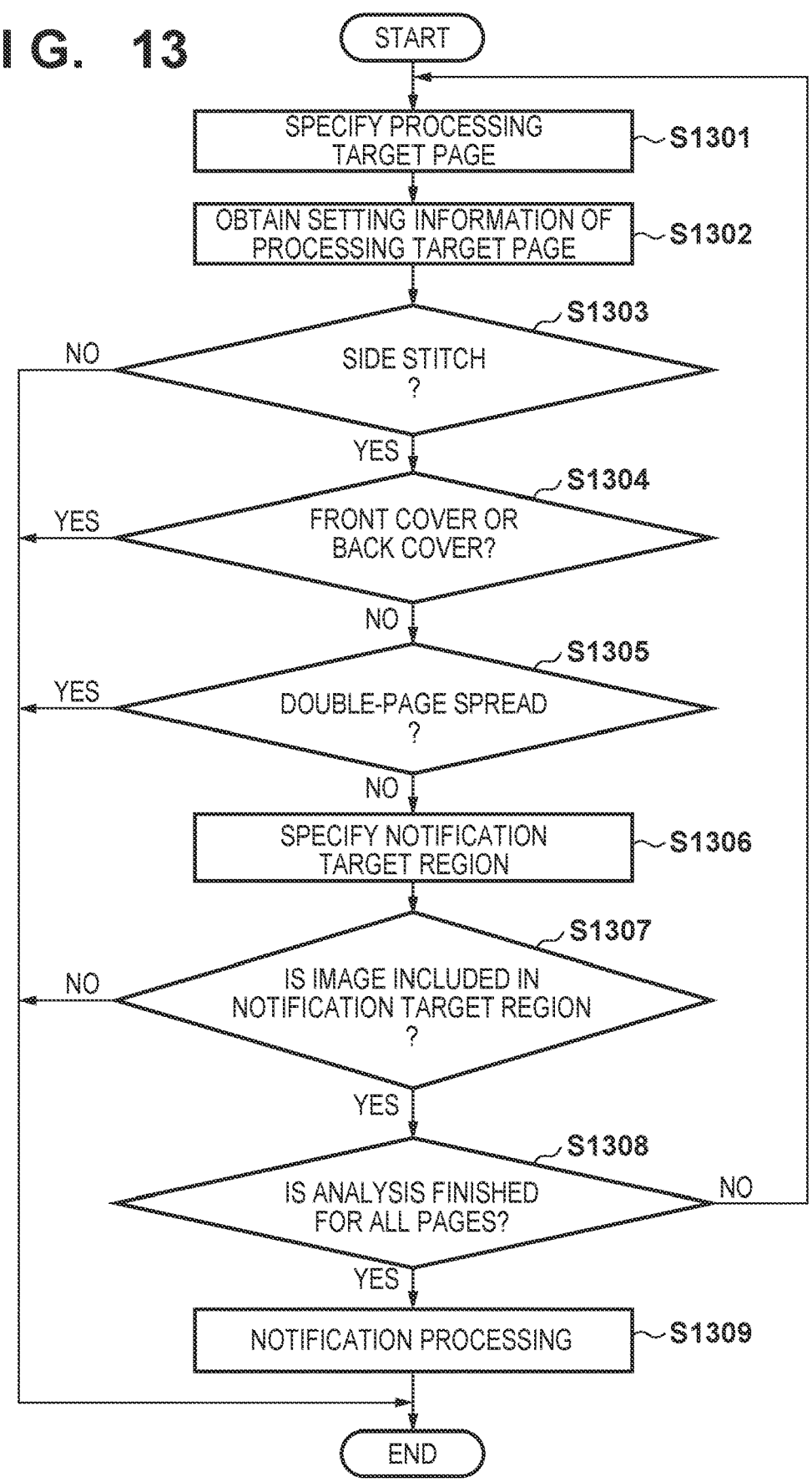
FIG. 13 is a flowchart of processing according to the second embodiment.

Processing according to this embodiment will be described with reference to FIG. 13. A processing procedure shown in FIG. 13 is implemented when a CPU 103 of an information processing apparatus 101 on which a bookbinding application 201 operates reads out a program corresponding to the bookbinding application 201 from an external storage device 106 or the like and executes it. This processing is executed when a print instruction is received from the user via a print setting screen.

In step S1301, the CPU 103 specifies a processing target page. More specifically, one of pages that are included in an edit screen and have not been analyzed in steps S1302 to S1307 is specified.

Processes in steps S1302 to S1307 are the same as those in steps S1102 to S1107 of FIG. 11 described in the first embodiment and a description thereof will be omitted.

In step S1308, the CPU 103 determines whether all the pages included in the edit screen have been analyzed in steps S1302 to S1307. If all the pages have been analyzed (YES in step S1308), the process advances to step S1309; otherwise (NO in step S1308), the process returns to step S1301.

Processing in step S1309 is the same as that in step S1108 of FIG. 11 described in the first embodiment, and a description thereof will be omitted. An example of a warning screen according to this embodiment will be described later with reference to FIG. 15.

[Warning Screen]

Figure 15:
FIG. 15 is a view showing an example of a warning screen according to the third embodiment.

FIG. 15 is a view showing an example of the warning screen according to this embodiment. Assume that in a display screen 1500 of the bookbinding application 201, a print setting screen 1501 is requested by a user operation, and then a print instruction is issued. In this case, assume that an image is laid out inside binding positions in one of pages forming a printing product. At this time, the bookbinding application 201 displays a warning screen 1502 to indicate that if printing is executed with this setting, the quality of the printing product may degrade. Note that this embodiment may adopt an arrangement in which information (for example, a page number) of the page for which a warning is displayed may also be displayed in the warning screen 1502. The warning screen 1502 may be a pop-up screen or may be configured to be displayed as a message in a predetermined region of the print setting screen 1501. Contents of the message are not limited to those shown in FIG. 15, and another message may be displayed.

According to this embodiment, it is possible to prevent printing from being executed so as to include an image designated by the user in a region that cannot be visually perceived by the user after printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-129462, filed Jul. 6, 2018, which is hereby incorporated by reference herein in its entirety.

What is claimed is:

1. A control method for an information processing apparatus that displays an edit screen of print data for printing a predetermined page, the method comprising:
displaying, on the edit screen, a print region that includes a binding position indicating a position at which binding is performed using a binding material in the predetermined page and indicates a printable region in the predetermined page;
receiving designation of a layout position of an image in the predetermined page;
determining whether the image is laid out in a predetermined region including at least a partial region in the print region between the binding position and a side of the print region on a side of the binding position; and
making a notification if the designation is received so that the image is laid out in the predetermined region and it is determined that the image is laid out in the predetermined region,
wherein if the predetermined page is a page bound by side stitch, the determining is executed,
wherein if the predetermined page is not a page bound by side stitch, the determination is not executed, and
wherein a printing apparatus executes printing based on the print data edited in the edit screen.

2. The method according to claim 1, further comprising detecting change of an edit target page from the predetermined page to another page in the edit screen,
wherein the notification is made if the designation is received so that the image is laid out in the predetermined region and the change of the edit target page from the predetermined page to the other page is detected.

3. The method according to claim 1, further comprising receiving a print instruction for executing printing based on the print data,
wherein the notification is made if the designation is received so that the image is laid out in the predetermined region and the print instruction is received.

4. The method according to claim 1, wherein if regions corresponding to a plurality of pages including the predetermined page are displayed in the edit screen, and the designation is received so that the image is laid out in the predetermined region, the region corresponding to the predetermined page is highlighted.

5. The method according to claim 1, wherein if one image is laid out to span the predetermined page and a page adjacent to the predetermined page, even if the designation is received so that the image is laid out in the predetermined region, the notification is not made.

6. The method according to claim 1, wherein if the predetermined page is a page corresponding to a cover in a booklet including the predetermined page, even if the designation is received so that the image is laid out in the predetermined region, the notification is not made.

7. The method according to claim 1, further comprising:
receiving designation of a layout position of the binding position in the predetermined page; and
specifying the predetermined region based on the binding position laid out based on the designation,
wherein if the designation is received so that the image is laid out in the specified predetermined region, the notification is made.

8. The method according to claim 1, wherein the notification is made by displaying a notification screen for notifying a user that the image is laid out in the predetermined region.

9. The method according to claim 1, wherein even if the image is laid out in a region outside the print region and outside the predetermined region, the notification is not made.

10. The method according to claim 1, wherein if the predetermined page is a page corresponding to a cover in a booklet including the predetermined page, the predetermined page and the binding position are printed based on the print data for printing the predetermined page, and
wherein if the predetermined page corresponds to a page that is not the cover in the booklet including the predetermined page, based on the print data for printing the predetermined page, the predetermined page is printed and the binding position is not printed.

11. A control method for an information processing apparatus that displays an edit screen of print data for printing a predetermined page, the method comprising:

displaying, on the edit screen, a print region that includes a binding position indicating a position at which binding is performed using a binding material in the predetermined page and indicates a printable region in the predetermined page;

receiving designation of a layout position of an image in the predetermined page;

determining whether the image is laid out in a predetermined region including at least a partial region in the print region between the binding position and a side of the print region on a side of the binding position;

making a notification if the designation is received so that the image is laid out in a predetermined region including at least a partial region in the print region between the binding position and a side of the print region on a side of the binding position; and sending the print data to a printing apparatus, wherein if the print data is sent to the printing apparatus, the printing apparatus executes printing based on the print data edited in the edit screen, wherein if the predetermined page is a page corresponding to a cover in a booklet including the predetermined page, the predetermined page and the binding position are printed based on the print data for printing the predetermined page, and wherein if the predetermined page corresponds to a page that is not the cover in the booklet including the predetermined page, based on the print data for printing the predetermined page, the predetermined page is printed and the binding position is not printed.

12. The method according to claim 11, further comprising detecting change of an edit target page from the predetermined page to another page in the edit screen, wherein the notification is made if the designation is received so that the image is laid out in the predetermined region and the change of the edit target page from the predetermined page to the other page is detected.

13. The method according to claim 11, further comprising receiving a print instruction for executing printing based on the print data, wherein the notification is made if the designation is received so that the image is laid out in the predetermined region and the print instruction is received.

14. The method according to claim 11, wherein if regions corresponding to a plurality of pages including the predetermined page are displayed in the edit screen, and the designation is received so that the image is laid out in the predetermined region, the region corresponding to the predetermined page is highlighted.

15. The method according to claim 11, wherein if one image is laid out to span the predetermined page and a page adjacent to the predetermined page, even if the designation is received so that the image is laid out in the predetermined region, the notification is not made.

16. The method according to claim 11, wherein if the predetermined page is a page corresponding to a cover in a booklet including the predetermined page, even if the designation is received so that the image is laid out in the predetermined region, the notification is not made.

17. The method according to claim 11, further comprising:

receiving designation of a layout position of the binding position in the predetermined page; and specifying the predetermined region based on the binding position laid out based on the designation, wherein if the designation is received so that the image is laid out in the specified predetermined region, the notification is made.

18. The method according to claim 11, wherein the notification is made by displaying a notification screen for notifying a user that the image is laid out in the predetermined region.

19. The method according to claim 11, wherein even if the image is laid out in a region outside the print region and outside the predetermined region, the notification is not made.

* * * * *